(12) United States Patent
Sampson

(10) Patent No.: US 7,010,565 B2
(45) Date of Patent: Mar. 7, 2006

(54) COMMUNICATION MANAGEMENT USING A TOKEN ACTION LOG

(76) Inventor: Scott E. Sampson, 652 S. 250 West, Orem, UT (US) 84058

(*) Notice: Subject to any disclaimer, the term of this patent is extended or adjusted under 35 U.S.C. 154(b) by 256 days.

(21) Appl. No.: 10/382,042

(22) Filed: Mar. 5, 2003

(65) Prior Publication Data
US 2004/0073621 A1 Apr. 15, 2004

Related U.S. Application Data

(60) Provisional application No. 60/415,321, filed on Sep. 30, 2002.

(51) Int. Cl.
*G06F 15/16* (2006.01)
(52) U.S. Cl. .................. 709/202; 709/206; 709/227
(58) Field of Classification Search ................ 709/204, 709/206, 227, 231, 202; 713/159, 172, 185, 713/103; 707/200
See application file for complete search history.

(56) References Cited

U.S. PATENT DOCUMENTS

| | | | |
|---|---|---|---|
| 4,931,933 A | 6/1990 | Chen et al. .................. 364/409 |
| 5,063,523 A | 11/1991 | Vrenjak ....................... 364/514 |
| 5,377,354 A | 12/1994 | Scannell et al. ............. 395/650 |
| 5,619,648 A | 4/1997 | Canale et al. .......... 395/200.01 |
| 5,724,567 A | 3/1998 | Rose et al. .................. 395/602 |
| 5,765,033 A | 6/1998 | Miloslavsky ........... 395/200.36 |
| 5,765,178 A | 6/1998 | Tanaka ........................ 707/526 |
| 5,802,253 A | 9/1998 | Gross et al. ................... 395/51 |
| 5,905,863 A | 5/1999 | Knowles et al. ....... 395/200.36 |
| 5,930,471 A | 7/1999 | Milewski et al. ...... 395/200.04 |
| 5,937,161 A | 8/1999 | Mulligan et al. ...... 395/200.36 |
| 5,999,932 A | 12/1999 | Paul ............................ 707/10 |
| 6,023,723 A | 2/2000 | McCormick et al. ........ 709/206 |
| 6,025,709 A | 2/2000 | Bradley .................... 324/158.1 |
| 6,055,637 A * | 4/2000 | Hudson et al. .............. 713/201 |
| 6,075,863 A | 6/2000 | Krishnan et al. .............. 380/49 |
| 6,112,227 A | 8/2000 | Heiner ........................ 709/203 |
| 6,122,631 A * | 9/2000 | Berbec et al. .................. 707/9 |
| 6,199,102 B1 | 3/2001 | Cobb .......................... 709/206 |
| 6,236,768 B1 | 5/2001 | Rhodes et al. .............. 382/306 |
| 6,249,807 B1 | 6/2001 | Shaw et al. ................. 709/206 |
| 6,279,111 B1 * | 8/2001 | Jensenworth et al. ....... 713/200 |
| 6,301,608 B1 | 10/2001 | Rochkind .................... 709/206 |
| 6,301,609 B1 * | 10/2001 | Aravamudan et al. ....... 709/207 |
| 6,321,267 B1 | 11/2001 | Donaldson .................. 709/229 |

(Continued)

FOREIGN PATENT DOCUMENTS

WO       WO 01/80011        10/2001

OTHER PUBLICATIONS

Davis, R.; "Network authentication tokens" Computer Security Applications Conference, 1989., Fifth Annual, Dec. 4-8, 1989 pp.: 234-238.*

(Continued)

*Primary Examiner*—Marc D. Thompson
(74) *Attorney, Agent, or Firm*—Kory D. Christensen; Stoel Rives LLP

(57) ABSTRACT

A communication system includes a token generator to create one or more tokens, as well as a token action log to associate each token with a customizable set of one or more actions, where each token is to trigger the associated set of one or more actions in response to accompanying a communication that experiences an event. The communication system also includes a token distributor to make the one or more tokens available for distribution to entities potentially desiring to communicate with the communication system.

75 Claims, 32 Drawing Sheets

U.S. PATENT DOCUMENTS

| | | | |
|---|---|---|---|
| 6,324,569 B1 * | 11/2001 | Ogilvie et al. | 709/206 |
| 6,397,261 B1 * | 5/2002 | Eldridge et al. | 713/171 |
| 6,415,275 B1 | 7/2002 | Zahn | 706/47 |
| 6,453,327 B1 | 9/2002 | Nielsen | 707/500 |
| 6,484,197 B1 * | 11/2002 | Donohue | 709/206 |
| 6,505,300 B1 * | 1/2003 | Chan et al. | 713/164 |
| 6,549,950 B1 | 4/2003 | Lytle et al. | 709/206 |
| 6,701,378 B1 * | 3/2004 | Gilhuly et al. | 709/206 |
| 6,721,784 B1 * | 4/2004 | Leonard et al. | 709/206 |
| 6,725,228 B1 * | 4/2004 | Clark et al. | 707/102 |
| 2001/0021927 A1 * | 9/2001 | Laurent et al. | 705/65 |
| 2002/0049961 A1 | 4/2002 | Fang et al. | 717/127 |
| 2002/0059454 A1 | 5/2002 | Barrett et al. | 709/245 |
| 2002/0087641 A1 | 7/2002 | Levosky | 709/206 |
| 2002/0099665 A1 * | 7/2002 | Burger et al. | 705/67 |
| 2002/0107925 A1 | 8/2002 | Goldschneider et al. | 709/206 |
| 2002/0116463 A1 | 8/2002 | Hart | 709/206 |
| 2002/0120581 A1 | 8/2002 | Shiavone et al. | 705/64 |
| 2002/0120600 A1 | 8/2002 | Shiavone et al. | 707/1 |
| 2002/0120702 A1 | 8/2002 | Shiavone et al. | 709/207 |
| 2002/0128033 A1 | 9/2002 | Burgess | 455/528 |
| 2002/0129111 A1 | 9/2002 | Cooper | 709/207 |
| 2002/0133469 A1 | 9/2002 | Patton | 705/75 |
| 2002/0174185 A1 | 11/2002 | Rawat et al. | 709/206 |
| 2002/0178381 A1 | 11/2002 | Lee et al. | 713/201 |
| 2002/0181703 A1 | 12/2002 | Logan et al. | 380/30 |
| 2002/0184344 A1 | 12/2002 | Elvanoglu et al. | 709/219 |
| 2002/0198945 A1 | 12/2002 | Thomas | 709/206 |
| 2002/0199095 A1 | 12/2002 | Bandini et al. | 713/151 |
| 2003/0009385 A1 | 1/2003 | Tucciarone et al. | 705/26 |
| 2003/0009698 A1 | 1/2003 | Lindeman et al. | 713/201 |

OTHER PUBLICATIONS

Attoh-Okine, N.O.; Shen, L.D.; "Security issues of emerging smart cards fare collection application in mass transit" Vehicle Navigation and Information Systems Conference, 1995. Proceedings. 6th International VNIS, Jul. 30-Aug. 2, 1995 pp.: 523-526.*

* cited by examiner

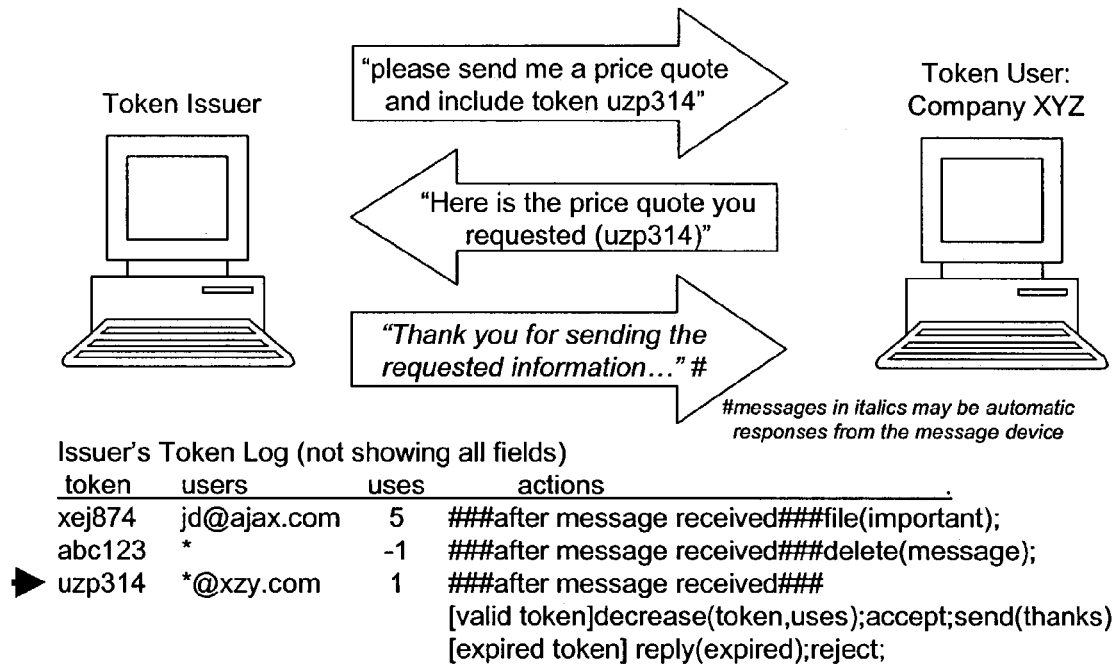

Issuer's Token Log (not showing all fields)
```
token    users         uses    actions
xej874   jd@ajax.com   5       ###after message received###file(important);
abc123   *             -1      ###after message received###delete(message);
▶ uzp314 *@xzy.com     1       ###after message received###
                               [valid token]decrease(token,uses);accept;send(thanks)
                               [expired token] reply(expired);reject;
```

Two weeks later...

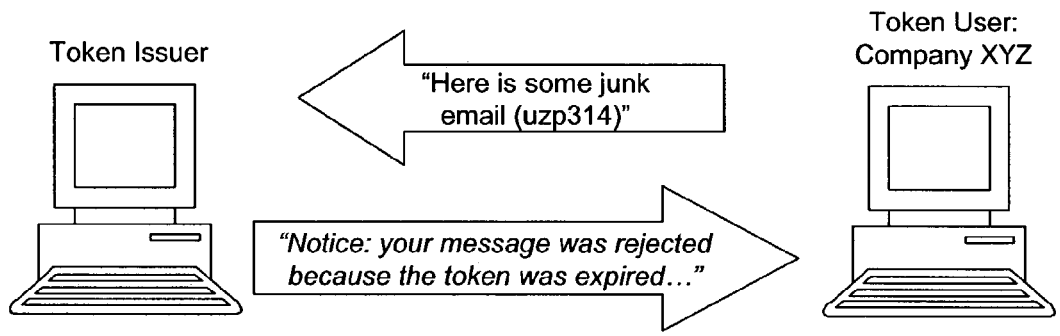

Issuer's Token Log (not showing all fields)
```
token    users         uses    actions
xej874   jd@ajax.com   5       ###after message received###file(important);
abc123   *             -1      ###after message received###delete(message);
uzp314   *@xzy.com     0       ###after message received###
                               [valid token]decrease(token,uses);accept;send(thanks)
                               [expired token] reply(expired);reject;
```

Token Issuer
555-9912

"please call me with a price quote and use token 36314" →

"ring ring" ← 555-9912#36314 "Here is the price quote you requested"

Token User:
Company XYZ
555-3826

Issuer's Token Log (not showing all fields)

| token | users | expiration | actions |
|---|---|---|---|
| 43874 | 555-8765 | - | ###after message received###ring(loud);say("mom"); |
| 76123 | * | 11Dec02 | ###after message received###reject; |
| ▶36314 | 555-382* | 10Aug02 | ###after message received### [valid token] ring(loud);accept; [expired token] reply(expired);reject; |

August 20, 2002...

Token Issuer
555-9912

(no ring) ← 555-9912@36314 (telemarketer)

"Notice: your message was rejected because the token was expired..." →

Token User:
telemarketer who works for Company XYZ

Issuer's Token Log (not showing all fields)

| token | users | expiration | actions |
|---|---|---|---|
| 43874 | 555-8765 | - | ###after message received###ring(loud);say("mom"); |
| 76123 | * | 11Dec02 | ###after message received###reject; |
| 36314 | 555-382* | 10Aug02 | ###after message received### [valid token] ring(loud);accept; [expired token] reply(expired);reject; |

FIG. 18

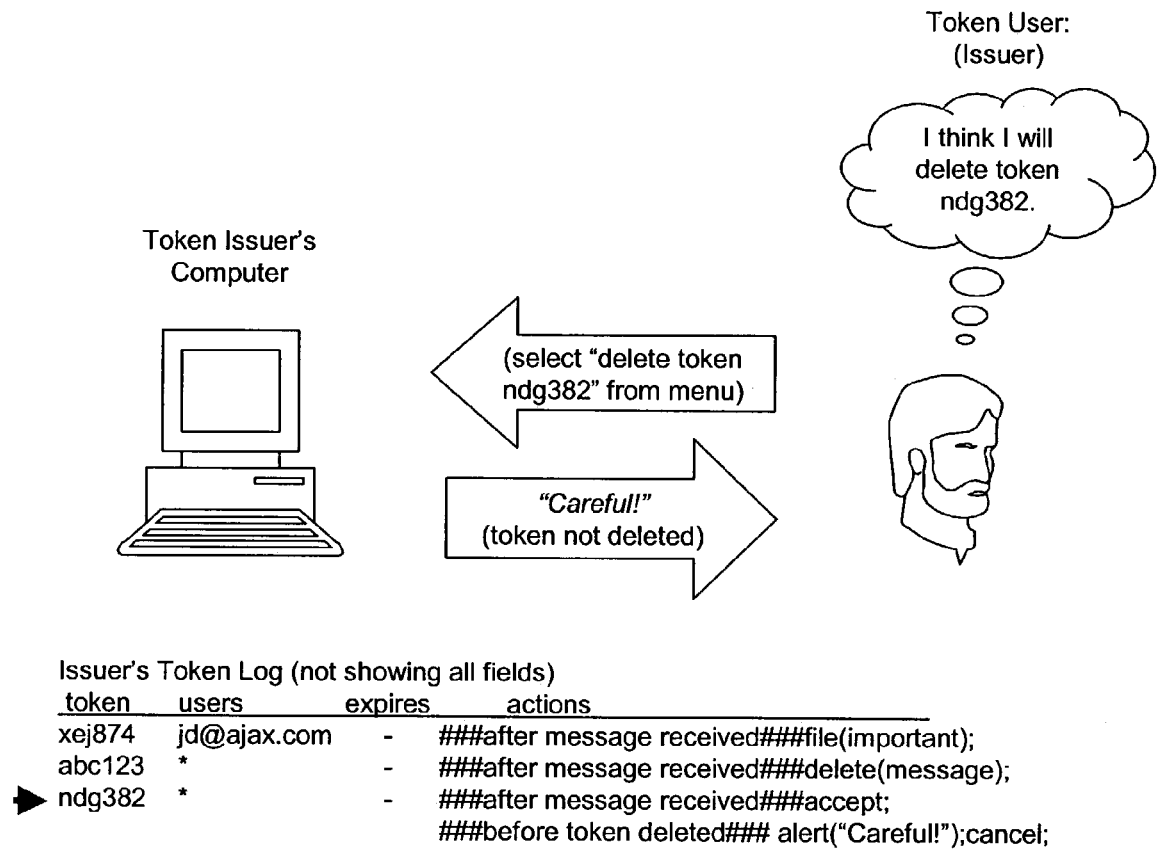

Token User:
(Issuer)

I think I will delete token ndg382.

Token Issuer's Computer (select "delete token ndg382" from menu)

"Careful!"
(token not deleted)

Issuer's Token Log (not showing all fields)
| token | users | expires | actions |
|---|---|---|---|
| xej874 | jd@ajax.com | - | ###after message received###file(important); |
| abc123 | * | - | ###after message received###delete(message); |
| ▶ ndg382 | * | - | ###after message received###accept; ###before token deleted### alert("Careful!");cancel; |

FIG. 22

Token Issuer:
Company 1. Customer purchases widget from department store.
producing
widgets. 2. Widget package contains the following note...

Token User:
(widget purchaser)

> Thank you for purchasing an XYZ widget. You are now entitled to 30 days of free access to our website. Go to our website and type your product serial number in the "token" field.

3. Customer goes to company website and enters the token in a web form...

Token Issuer's Web Server

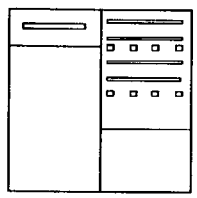

*token (product serial number): [385-322]*

*"Welcome to your 30-day trial of our website..."*

Token User's Web Browser

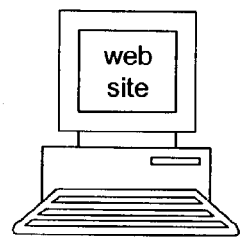

Issuer's Token Log - BEFORE (not showing all fields)
token    users    expires    actions

---

Issuer's Standard Treatments Token Log (not showing all fields or field contents)
treatment    users    actions
default       *       ###after web-form received###
                      [invalid token]
                          if (token is a valid serial number) {
                          create_token(token="{this.token}",
                              expires=now+30 days,
                              action="treat(trial_user);");
                          } else {send(warning);}
trial_user    *       ###after web-form received###
                      [valid token]
                          authenticated;
                      [expired token]
                          send(trial-expired-send-money);

---

Issuer's Token Log - AFTER (not showing all fields)
token      users    expires    actions
▶ 385-322    *      30May02    treat(trial_user);

FIG. 23

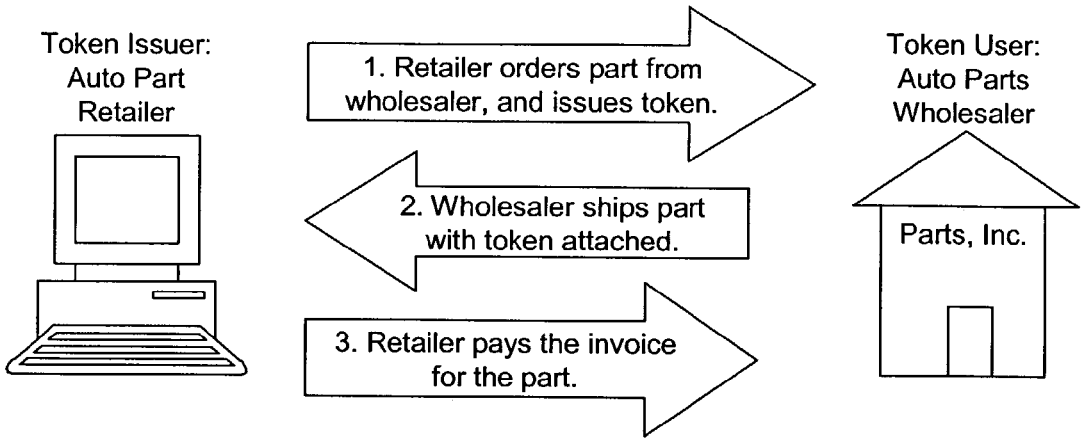
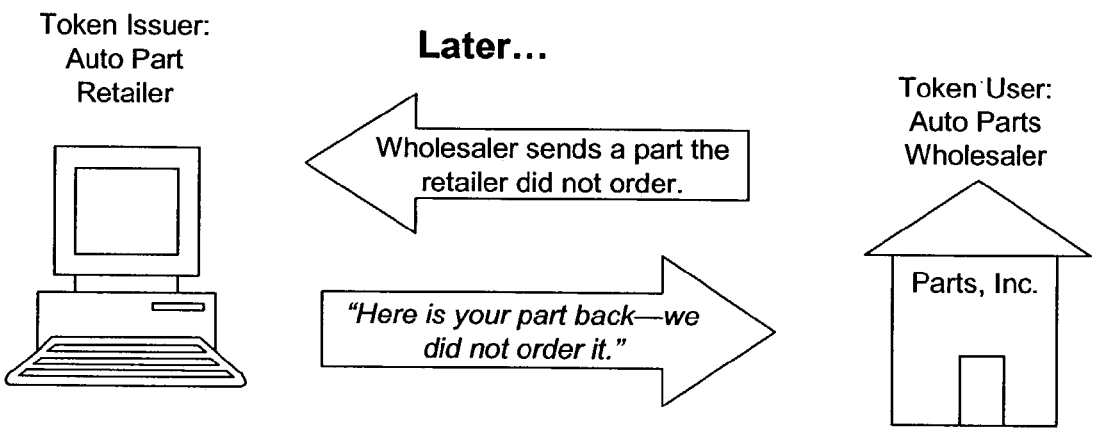
FIG. 24

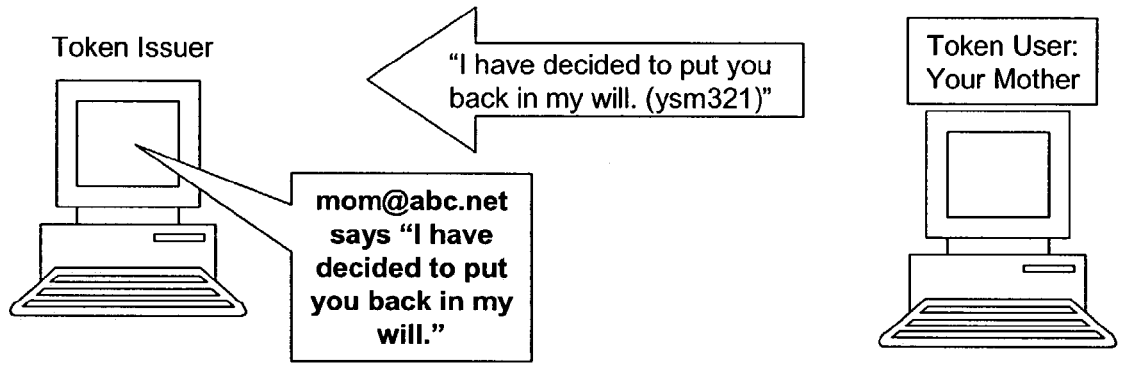

Issuer's Token Action Log (not showing all fields)
```
token     users         uses    actions
xej874    jd@ajax.com    5      ###after message received###file(important);
abc123    *             -1      ###after message received###delete(message);
▶ ysm321  mom@abc.net   -3      treat(important);
```

Issuer's Standard Treatments Token Action Log (not showing all fields)
```
treatment  users       actions
important   *          ### after message received ###
                          [[[valid token]]]
                             decrease(token,uses);
                             font(subject,red,bold);
                             accept;

before message deleted ###
                       confirm("Sure you want to delete this important message?");
```

FIG. 26

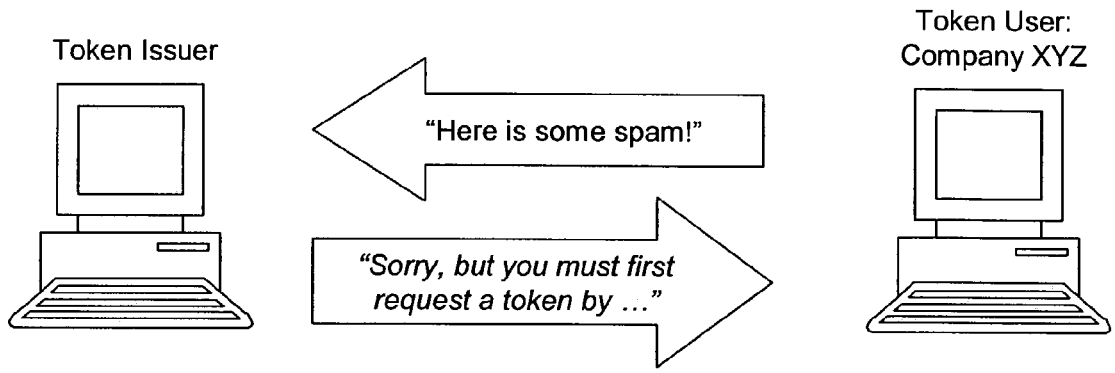

Issuer's Standard Treatments Token Action Log (not showing all fields)
```
treatment   users           actions
default       *             ### after message received ###
                            [[[valid token]]]
                                decrease(token,uses);
                                accept;

[[[expired token]]]
                                reply(expired);
                                reject;

[[[blank token]]]
                            if_match(subject,/^request.*?token/);
                                prompt({from} requesting token: {subject});
                                reply(issue);
                                reject;
                            else;
                                reply(suggest);
                                reject;
                            end_if;

[[[invalid token]]]
                                reply(invalid);
                                reject;

after message displayed ###
                                set(read,yes);
```

FIG. 27

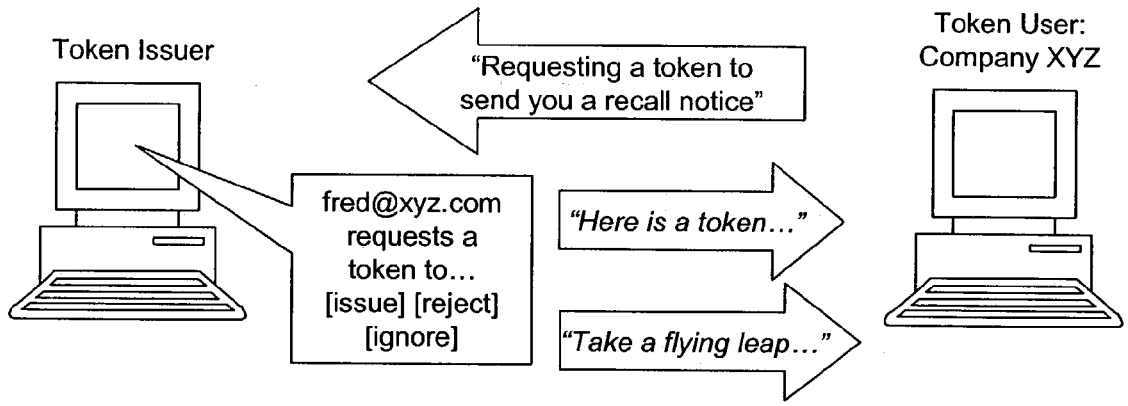

Issuer's Standard Treatments Token Action Log (not showing all fields)
treatment   users         actions
default      *            ### after message received ###
                            [[[valid token]]]
                                decrease(token,uses);
                                accept;

[[[expired token]]]
                                reply(expired);
                                reject;

[[[blank token]]]
                            **if_match(subject,/^request.*?token/);**
                                prompt({from} requests a token to {subject});
                                reply(issue);
                                reject;
                            else;
                                reply(suggest);
                                reject;
                            end_if;

[[[invalid token]]]
                                reply(invalid);
                                reject;

after message displayed ###
                                set(read,yes);

FIG. 28

COMMUNICATION MANAGEMENT USING A TOKEN ACTION LOG

RELATED APPLICATIONS

This application is related to and claims the benefit of U.S. Provisional Application No. 60/415,321, filed Sep. 30, 2002, for "Function and Use of a Token Action Log," with inventor Scott E. Sampson, which application is incorporated herein by reference in its entirety.

COPYRIGHT NOTICE

© 2003 Scott E. Sampson. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present invention relates generally to communication systems. More specifically, the present invention relates to a system and method for managing communications using a token action log.

BACKGROUND OF THE INVENTION

With the recent explosion of new communication options, including email, instant messaging, and cellular telephony, a greater need exists for ways to manage the myriad of communications that a person receives each day. Unfortunately, unsolicited commercial solicitations, often referred to as "spam," make communication management difficult.

Internet Service Providers (ISPs) and other businesses lose millions of dollars and countless hours of lost productivity as a result of unsolicited commercial email. Spam clogs the Internet, computer systems, and email accounts, slowing down operations and, at times, causing system shutdowns and failures. Expenses include the cost of new computer hardware to handle the increased flow of email created by spam, filtering software to cut down the flow of spam, and staff time spent identifying and deleting junk email.

Spam also hurts consumers. Many people still pay hourly rates for Internet access, including those who use wireless Internet services and business travelers who download email while on the road. These consumers have to pay for the time they spend downloading these unsolicited messages to their computer from the Internet.

Most ISPs also limit the space available in account mailboxes for consumers to store email messages. Spam fills mailbox space that consumers could utilize for other purposes. It also becomes inconvenient to sort through when an individual is checking for personal messages in an email account.

The content of spam is also a troublesome issue. While some spam messages are from legitimate businesses, a majority of these emails are promoting various scams and schemes or sexually oriented Web sites. Many people become victims of the "get rich quick" schemes in these emails. In other situations, pornographic images and messages end up in the mailboxes of unsuspecting families with children.

Current technical solutions are generally regarded as inadequate to stop the flow of spam and other unsolicited communications. Most technical solutions attempt to find a balance between spam elimination and reducing false positives (i.e. removal of legitimate messages). However, no prior solution is perfect. Aggressive spam-elimination systems result in too many false positives, while more conservative systems fail to block a large number of spam messages.

Of course, unsolicited communications are not limited to the Internet. Many people still receive unsolicited telephone calls and facsimiles, despite tougher legislation and state and national do-not-call lists.

A further problem is found in the great quantities of desirable communication that is received. Even though much communication is desired, excessive communication can lead to "information overload." One effect of this problem is an inordinate amount of time that it takes to sort through and process the desirable communication. Mechanisms are needed for more effectively managing all types of communication that is received, both desirable and undesirable communication.

SUMMARY OF THE INVENTION

In one embodiment, a communication system includes a token generator to create one or more tokens and a token action log to associate each token with a customizable set of one or more actions. Each token is to trigger the associated set of one or more actions in response to accompanying a communication that experiences an event. The event may be receiving the communication within the communication system. Other events are contemplated, however, such as deleting the communication, reading the communication, printing the communication, forwarding the communication, replying to the communication, and archiving the communication.

In addition to a code, symbol, or other identifier, tokens may include or be associated with various other information, such as an indication of an issuer of the token, an indication of one or more entities to whom the at least one token is issued, and/or an indication of an intended purpose for the at least one token.

The communication system may be embodied as any audio, video, or text messaging system, non-exhaustive examples of which include an email system, a telephone system, an instant messaging system, and a short text messaging system.

In one embodiment, the communication system also includes a token distributor to make the one or more tokens available for distribution to entities potentially desiring to communicate with the communication system.

Each token may correspond to a group of entities. For example, tokens may correspond to groups of entities including family members, friends, business associates, and students within a particular class.

The token distributor may distribute the tokens to the corresponding groups of entities in various ways. For example, the token distributor may publish at least a subset of the tokens in a document viewable by entities potentially desiring to communicate with a user of the communication system. An example of this document may include an online directory, a printed directory, a business card, or a course syllabus.

The token distributor may also transmit at least a subset of the tokens in a communication to one or more entities potentially desiring to communicate with the communication system. The communication may be an email message, telephone call, or other type of communication.

In one embodiment, the system also includes a communication receiver to receive a communication accompanied by a specific token previously generated within the communication system. A lookup module within the system searches the token action log for a set of one or more actions associated with the specific token.

The system further includes an action manager to execute the set of one or more actions found by the lookup module. Various actions are possible within the scope of the invention. For example, one action may be presenting the communication to an operator of the communication system (e.g., receiving the communication into an inbox). Other actions may include, without limitation, rejecting the communication, sending a reply to the communication, tagging the communication with an identifier, deleting the communication, forwarding the communication to a recipient, activating a device, audibly alerting the user of the communication system, visually alerting the user of the communication system, extracting information from the communication, modifying the token action log, generating a new token, and sending a previously generated token.

In certain embodiments, an action includes conditional (if-then-else) logic. Moreover, a token may include or be associated with a set of parameters, in which case the action manager is to execute the set of one or more actions by calling an appropriate function with the set of parameters.

In one implementation, tokens may include or be associated with conditions for token use, and the system is to perform one or more operations (such as rejecting the communication) in response to the conditions. The conditions for use may include, for example, an expiration date or a set number of uses of the token.

Where a communication is accompanied by an additional token, the lookup module is to search the token action log for a second set of one or more actions associated with the additional token, after which the action manager is to execute the second set of one or more actions.

In certain embodiments, a token distributor may receive a communication that does not include a token. In response, the token distributor may request an acknowledgement from the sender of the communication. Thereafter, the token distributor may transmit a token to the sender only in response to receiving the requested acknowledgement. The acknowledgement may be required to include a statement of the sender's purpose for the communication, in which case a user of the communication system may be prompted to decide whether a token is to be issued.

To prevent automatic acknowledgements, the token distributor may send a communication to the sender including an image attachment (e.g., GIF, JPEG) that depicts a code. The message may further instruct the sender to send an acknowledgement including the depicted code, in which case a token is sent only if the acknowledgement includes the code.

In some cases, the token distributor may automatically assign a token to a communication that did not arrive with a token. This may occur, for example, where the return address for the communication is found in an address book of a user of the communication system.

Additional aspects and advantages of this invention will be apparent from the following detailed description of preferred embodiments, which proceeds with reference to the accompanying drawings.

BRIEF DESCRIPTION OF THE DRAWINGS

FIG. 17 is a dataflow diagram showing the use of a token action log in the context of email filtering;

FIG. 18 is a dataflow diagram showing the use of a token action log in the context of a telephone filter;

FIG. 22 is a dataflow diagram showing the use of a token action log in the context of token control;

FIG. 23 is a dataflow diagram showing the use of a token action log in the context of a website trial;

FIG. 24 is a dataflow diagram showing the use of a token action log in the context of auto part ordering;

FIG. 26 is a dataflow diagram showing an example of an "important" standard treatment;

FIG. 27 is a dataflow diagram showing a procedure for handling unsolicited communications;

FIG. 28 is a dataflow diagram showing a procedure for requesting a token;

DETAILED DESCRIPTION

Figure 1:
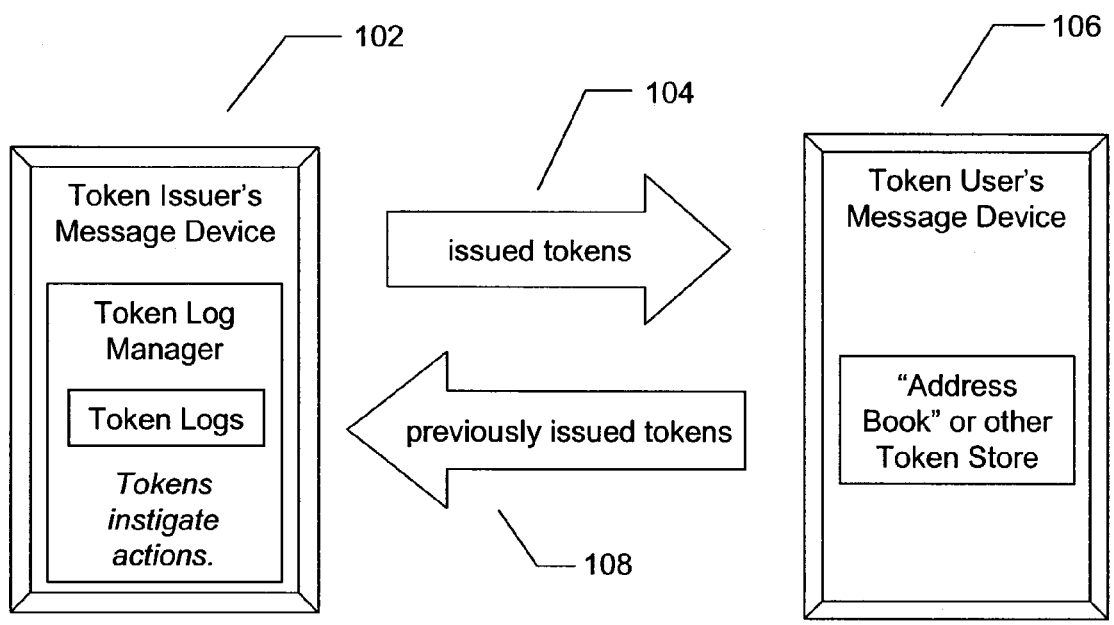
FIG. 1 is a block diagram of a token and a token action log.

Reference is now made to the figures in which like reference numerals refer to like elements. For clarity, the first digit or digits of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or not described in detail to avoid obscuring aspects of the invention. Furthermore, the described features, structures, or characteristics may be combined in any suitable manner in one or more embodiments.

While the following description uses numerous examples involving communication management, those of skill in the art will recognize that the principles disclosed herein are also applicable to other fields. Similarly, while the following description makes frequent mention of "messages," other types of "objects" are included within the scope of the invention.

Referring to FIG. 1, a token issuer may have a message device 102, such as a cellular telephone, an email client, a web server, etc. As described in greater detail below, the message device 102 includes a token action log manager (TLM), which is typically a software module for creating token action log entries, issuing tokens and managing any actions associated with the tokens in the token action log. The TLM may be part of a communication system, such as an email system, a telephone system, an instant messaging system, or a paging system.

The token issuer creates tokens and issues 104 specific tokens to specific potential token users. The users may correspond to a particular group or class, i.e. family members, friends, business associates, and students within a particular class. However, unique tokens can be issued to individual users. Multiple tokens with different purposes may be distributed to one or more entities.

In some situations, the token user might be the same as the token issuer, or might be a separate process running on the token issuer's message device 102. However, usually the token user is some other entity that desires to communicate or otherwise interact with the token issuer. When a new token is created by the token issuer, the token and a corresponding set of one or more actions are recorded in the issuer's token action log.

In one embodiment, the set of actions is customizable, i.e., a user may specify or select various actions to be associated with a particular token. As described below, certain actions may be able to spawn one or more other actions. In addition, certain actions may include conditional (if-then-else) logic. Various actions are possible within the scope of the invention, examples of which include rejecting a communication, sending a reply to a communication, tagging a communication with an identifier, deleting a communication, forwarding a communication to a recipient, activating a device, audibly alerting a user of a communication system, visually alerting a user of a communication system, extracting information from a communication, modifying a token action log, generating a new token, and sending a previously generated token.

In one embodiment, a token action log is a list of tokens that have been issued, including conditions under which they can be validly used and actions that they motivate. A token action log may also contain other information, such as the actual purpose of the token and the communicated purpose, as well as conditions under which a given token is valid. Other possible names for a token action log include "token repository," "token registery," "token register," etc. However, the term "token action log" will be used herein, or "token log" for short.

When a token user's message device 106 receives a new token, the received token may be kept in an address book or in some other token store. Note that this token store is different from a token action log. A token action log contains tokens issued by that person. A token store, or address book, contains tokens issued by others.

When appropriate, the token user returns 108 one or more tokens issued by a token issuer back to the token issuer, usually as part of some message (or other object). When previously issued tokens are received by the issuer, the issuer's message device 102 takes appropriate actions as noted in the issuer's token action log.

As described in greater detail below, receiving a communication with a token is only one "event" that may cause an associated action to be performed. Other events that may trigger actions include deleting the communication, reading the communication, printing the communication, forwarding the communication, replying to the communication, and archiving the communication.

For clarity, FIG. 1 does not depict encryption or complex authentication in the communication. Certainly, issued tokens or tokens being used can be encrypted to prevent interception in route. In addition, methods can be employed to verify that the token user is in fact the entity the user purports to be. Various encryption and authentication methods could be used for that purpose.

Figure 2:
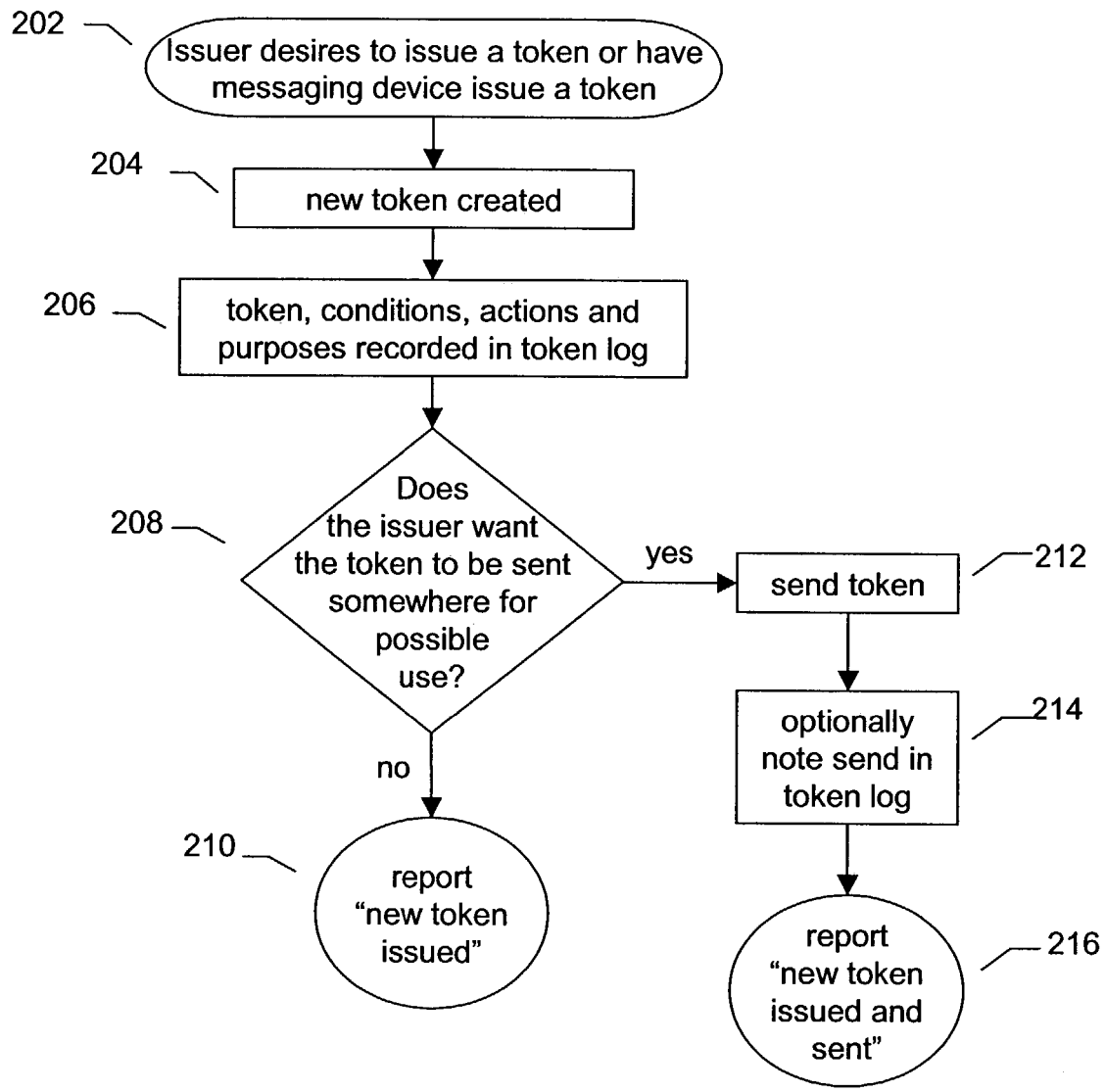
FIG. 2 is a flowchart of a procedure for issuing new tokens.

FIG. 2 describes a process for issuing tokens. The procedure begins by the issuer desiring to have a token issued 202. Perhaps an individual desires to communicate with the issuer, and realizes that effective communication requires tokens. Alternatively, the issuer is expecting a message from a company or individual, but does not want to receive subsequent messages from that company or individual (e.g., junk messages or "spam").

In this context, a "token" is a symbol that potentially initiates action on the token issuer's message device. The precise format of tokens is not crucial. For example, a token may be an series of alphanumeric characters surrounded by XML tags <token> and </token>. A token used in telephone communication may be be a series of numbers that could be sent with a phone number. A given phone number might be followed by #token, such as 555-1212#8793, where 8793 is the token used by that token user. In still other embodiments, a token may be a series of alphanumeric characters preceded by some unique tag such as the letters "tk."

For email systems, the token might be included in the MIME headers (i.e. in a "token:" header field), in the subject of the message, in the body of the message, or as part of the token issuer's email address. The RFC822 email address specification allows for an email user's name, the email address, and a comment in parenthesis. Hence, the token may be included in the comment portion of the email address. An advantage of that method is that those comments are often captured in email client address books, for later use.

Tokens may also come in a message that includes data that serves as parameters to be used by the token actions. Token parameters may be specified in various data formats. The following are some examples . . . .

```
tk123abc:purposes(parameter_type:parameters)
tk123abc:purposes(cgi-get:user=samp22
tk123abc(xml:token_data)
```

This last example may point to parameters embedded in some XML tags in the message (e.g., <token_data>parameters</token_data>).

An XML data type definition (DTD) for formatting tokens is shown by the following example:

```
<?xml?>
<tokens>
    <token value='abc123'>
        <parameters>
            <parameter>
                <name>user</name><value>Smith22</value>
            </parameter>
            <parameter>
                <name>group</name><value>members</value>
            </parameter>
        </parameters>
    </token>
</tokens>
```

Of course, email address specifications may be augmented to allow tokens to be embedded in email addresses, an example of which may be: "#token#user@subdomain.domain." This builds upon the idea that the use of a TLM system can be viewed as a token issuer giving different people "different" email addresses for contacting the issuer (but with just one general email account).

Regardless of the format of tokens, they are created using any suitable method 204. For example, a token could be created as a series of random alphanumeric characters. Alternatively, it could be created from some pre-determined sequence of characters. The token may be given by an operator or may be given by another entity authorized by the operator.

In one embodiment, the created token is checked to ensure that it is unique—i.e. does not already exist in the issuer's token log. Nevertheless, this check of uniqueness might be omitted if the created tokens are sufficiently random and if the cardinality of possible tokens is sufficiently large. For example, if tokens are defined as a random sequence of six lower-case letters, then there are 26 raised to the $6^{th}$ power, or 308,915,776 possible tokens. Even if the issuer has already had 1,000 other unique tokens in the token action log, there is still only a 1 in 308,915.776 chance of a new random token being identical to a previously logged token.

When a new token is created, it is recorded in the token action log 206. The token action log may also include conditions under which the token is valid, such as date ranges or number of times it can be used. Further, the token action log entry indicates what actions are associated with the given token. The concept of token actions will be apparent in the further explanation of the token handling processes. The issuer has the opportunity to change token action log entries at any time.

For illustrative purposes, the following are some sample token actions that would be relevant in an email client that incorporates a TLM.

TABLE 1

| Action | Description |
|---|---|
| accept; | accepts new message into mail in-box |
| reject; | avoids receiving the message |
| prompt; | prompt whether to actually take the other specified actions |
| font(field,attribute[,attribute...]) | enclose the field in font attributes, e.g., font(subject,bold) |
| file(folder name); | files the message in a named folder |
| reply(message[,email_address[, first_name]]); | sends an email message to email address |
| issue(token,message[,email_address[,first_name]]); | issues a given token (or a new token if blank) |
| set(field,value); | sets the given message field to the given value, e.g., set(category,school); |
| append(field,value); | appends the given field with the given value (comma delimited) |
| record(type,file) | record data in a file using template (such as survey response data) |
| log(type,file) | logs data in a file (again, such as survey response data) |
| run(program,parameters,...) | runs a program |
| play(multimedia file) | plays music or video |
| alert(message) | displays a message for the issuer |
| if_confirm(message)?; | prompt to continue, |
| delete(message|token); | deletes the message or token |
| beep(type) | Makes an audible signal |
| x10(housecode,modulecode, command) | Sends an X10 command to control a home device |
| decrease(token,uses); | Decrease the token "uses" field |
| cancel; | cancel the requested function (if the event is before that function was performed-otherwise it is probably too late to cancel the function) |
| if_match(messagefield,/re/)?; | Compares a field to a regular expression |
| else; | Indicates actions if the comparison does not match |
| end_if; | Indicates the end of the "if" statement block |
| treat(standard_treatment); | Use the given actions from the standard treatments token action log. |

It is possible that a token issuer may want to have multiple entries for a given token in a given token action log, perhaps with different conditions under which they match or are valid. For example, the token "abc123" might exist in the token action log first as used by person "john_doe@somewhere.com" and second as used by "don_johns@there.com." Yet, it may be more convenient to give those two users their own unique tokens.

A determination 208 is made whether the issuer desires that the token be sent somewhere, since one use of tokens is for them to be subsequently returned to the issuer. If not, the procedure might simply report 210 that the new token was created, which method is described below.

Often, new tokens are sent 212 or otherwise communicated to some other individual or entity (specific token "users") who may desire to communicate with the issuer and can return the tokens to the issuer with future messages. Tokens may be sent any number of ways, such as via email or telephone.

In certain configurations, tokens may be published in a document viewable by entities potentially desiring to communicate with the issuer. The document may be physical or electronic, and may include, for example, a directory, a business card, or a course syllabus.

In one embodiment, a token includes an indication of an explanation of what the token is and why it needs to be attached to a subsequent message. Optionally, a token might be sent with an explanation of the intended purpose of the token. Examples of message token purposes may include:

acknowledge receipt of message
answer a question
ask a question
check schedule
identify a general class of token users
request another token
confirm receipt of message
conversation
general purpose
RSVP a meeting request
schedule a meeting
send information
send newsletter
send urgent message
submit survey answers
identify junk email
request authorization of a financial transaction The intended purpose of a token might be recorded in the token file. However, it might not always be desirable to make the purpose of the token publicly known. For example, a "delete this message" token might be given to a retailer who is likely to send junk email. The intended purpose of the token is to eliminate messages, but the token issuer would not necessarily want to say that to token users. Instead, the token issuer might want to say that the purpose of the token is "for any messages." That is the "disclosed purpose."

Both the intended purpose and the disclosed purpose might be recorded in the token action log. The disclosed purpose would also be sent with the message when the token is issued or reissued.

When a new token is sent to a user, it may be desirable to record 214 in the token action log or the token itself an indication of to whom the token was sent. This is useful should the issuer desire to identify who might be impacted should specific tokens be changed. The token action log and/or the token itself may also include an indication of the token issuer.

Figure 3:
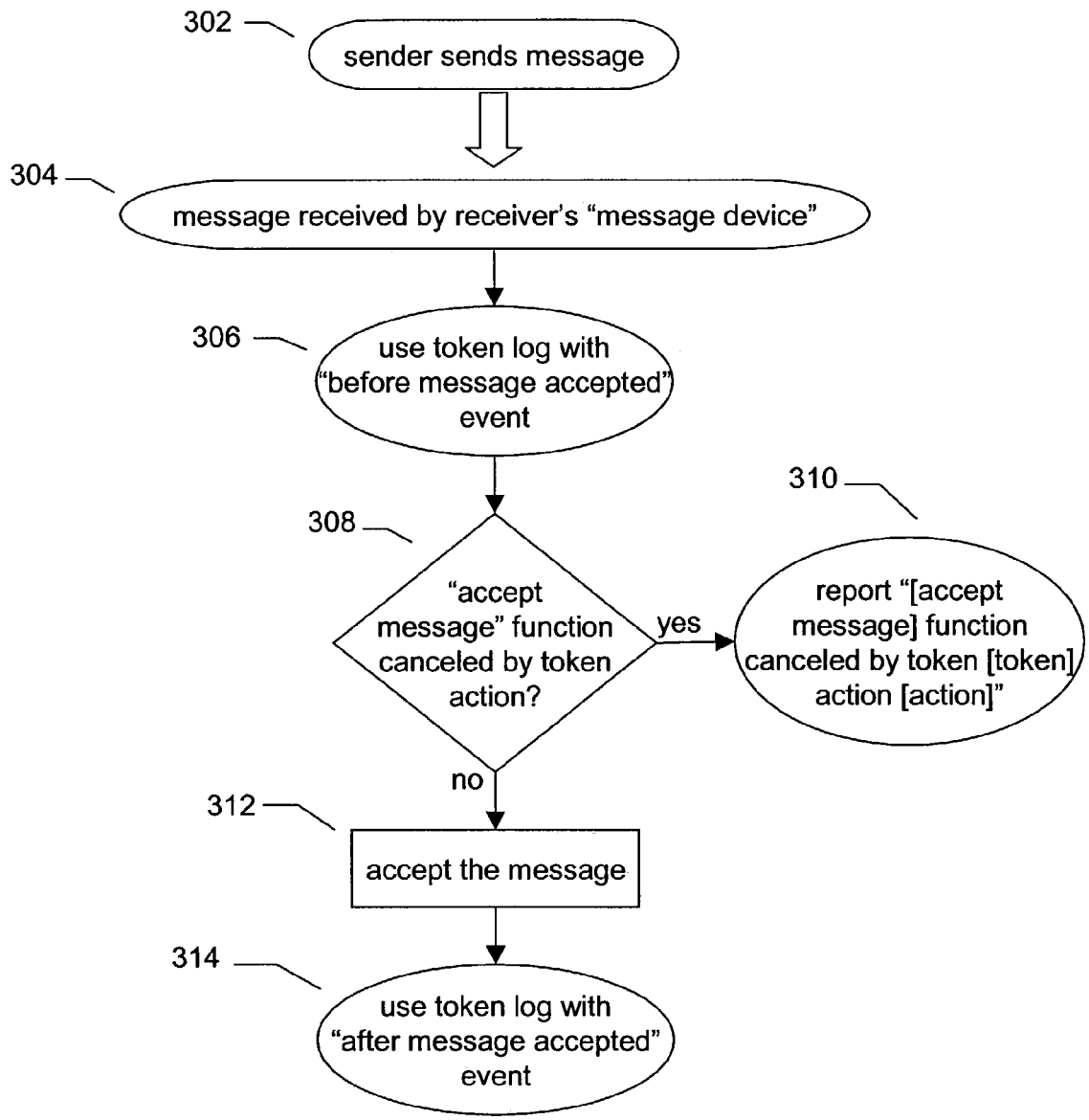
FIG. 3 is a flowchart of a procedure for handling newly received messages.

FIG. 3 describes one use of tokens—sending them in a message back to the token issuer. In this case, the message sender (i.e. token "user") sends 302 a message to a receiver who is the token "issuer." The message is received 304 by the receiver's message device. The receiver's message device contains a token log manager (TLM), which is part of a message processor or works with the message processor (e.g., email client).

The TLM is called upon to check 306 for actions that correspond to any tokens that are included with the message, given the event of "before message accepted." The processing of tokens, is described in detail in later figures. The TLM may determine 308 from actions in the token action log that the function to accept the message should be canceled, in which case the message is not accepted and that occurrence is reported 310.

If the token action log actions do not indicate to cancel the function (or reject the message), then the message processor can perform the function to accept the message (e.g., receive it into the in-box) 312. Thereafter, the TLM again checks the token action log for actions for after the message is accepted 314.

Figure 4:
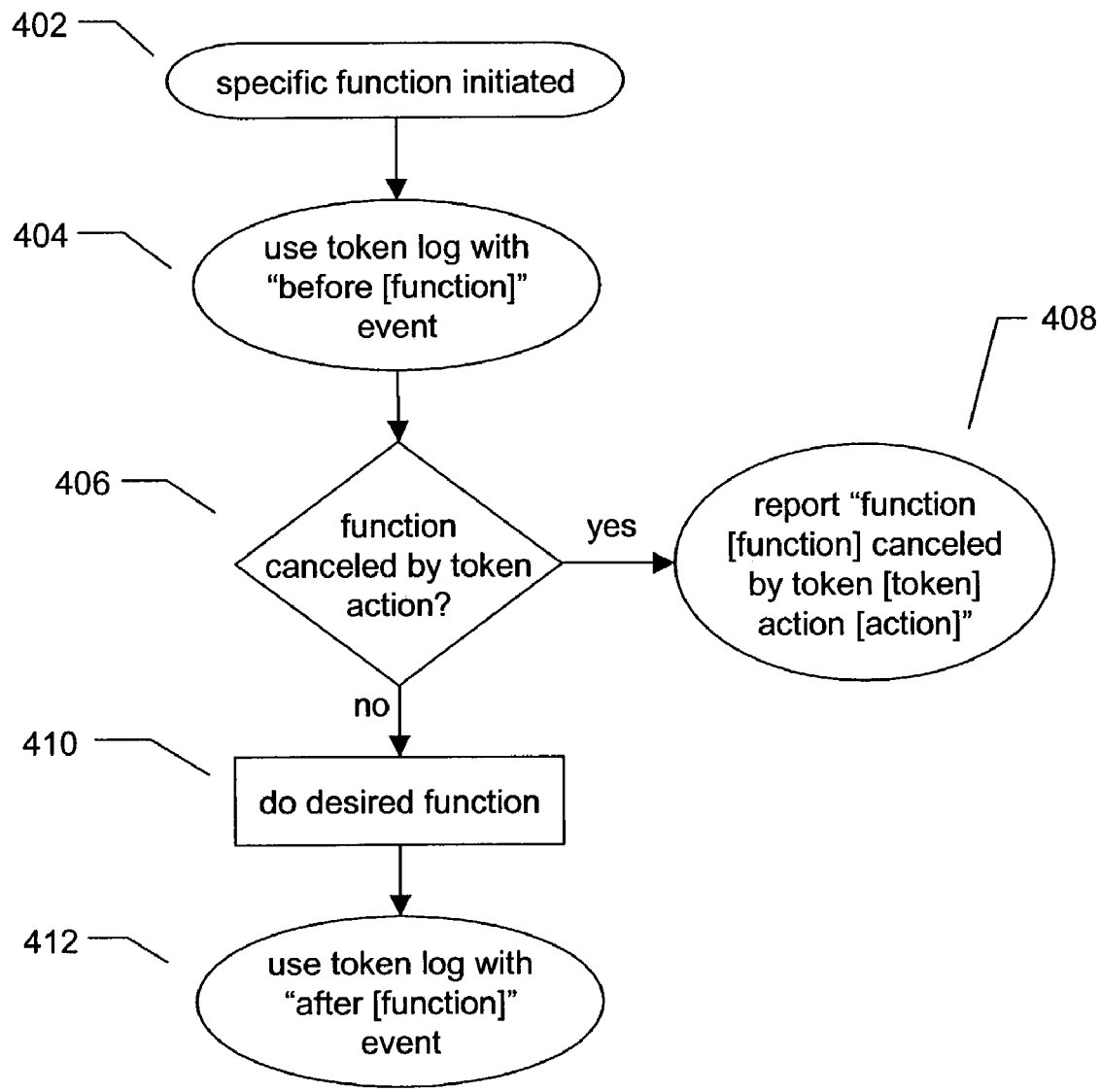
FIG. 4 is a flowchart of a procedure for initiating functions.

Referring to FIG. 4, the general use of token action logs can be described via a "Function Initiated" procedure, where a "function" can be any function of the token issuer's device. Functions of message devices include placing calls, filing messages, replying to messages, etc. For message functions, the execution of functions is generally the responsibility of the message processor. For token functions, such as creating a token or deleting a token, the function processing is generally the responsibility of the TLM. Nevertheless, in many cases the TLM is an integral part of the message processor, or it is called by the message processor.

The procedure begins when a function is initiated 402. The TLM is first called upon to "use the token action log" with the event "before [the given function]" 404. This checks for token actions to be performed before the given function is initiated, which is described in detail in subsequent figures. The token may actually cancel the function 406, in which case the function is not performed and the canceling of the function is possibly reported 408.

If the function is not canceled, the TLM or message processor initiates the function 410. For example, the message processor may be an email client that has a subroutine that deletes messages. If the TLM determines (via information in the token action log) that the delete function should be canceled, then the email client should not delete the message.

After a function is performed 410, the TLM again uses the token action log with the event "after [the given function]" 412, which checks for token actions to be performed after that function is performed.

For example, when a new token is created, the TLM is accessed with the event "after token created" for the new token. Or, if a new token is about to be sent to a potential token user, the TLM is accessed with the event "before token sent." After the token is sent to the potential user, the TLM is accessed with the event "after token sent." In this case, we are referring to sending the issuer's token, not a token received from another issuer. The TLM only acts on tokens which are recorded in the communication system's token action log. This includes tokens which were previously created and distributed by the TLM, as well as tokens accepted by the TLM from authorized other entities.

Figure 5:
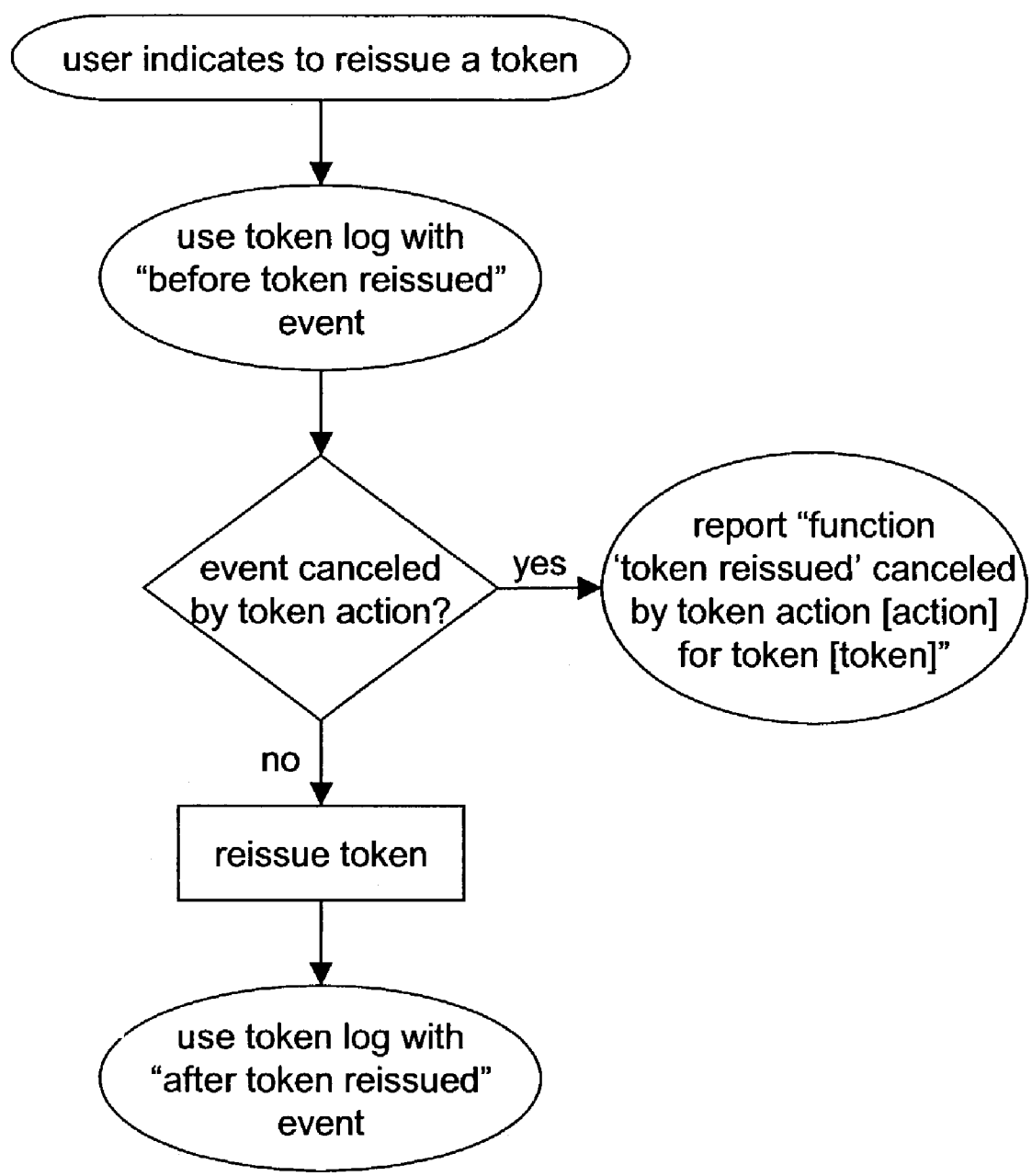
FIG. 5 is a flowchart of a procedure for reissuing tokens.

FIG. 5 shows a "Function Initiated" example of the TLM action to be taken if a previously issued token is re-issued. In this case, the event is a token event, since it was not received as part of a message, at least not until it is attached to a message to be sent to a potential token user.

Figure 6:
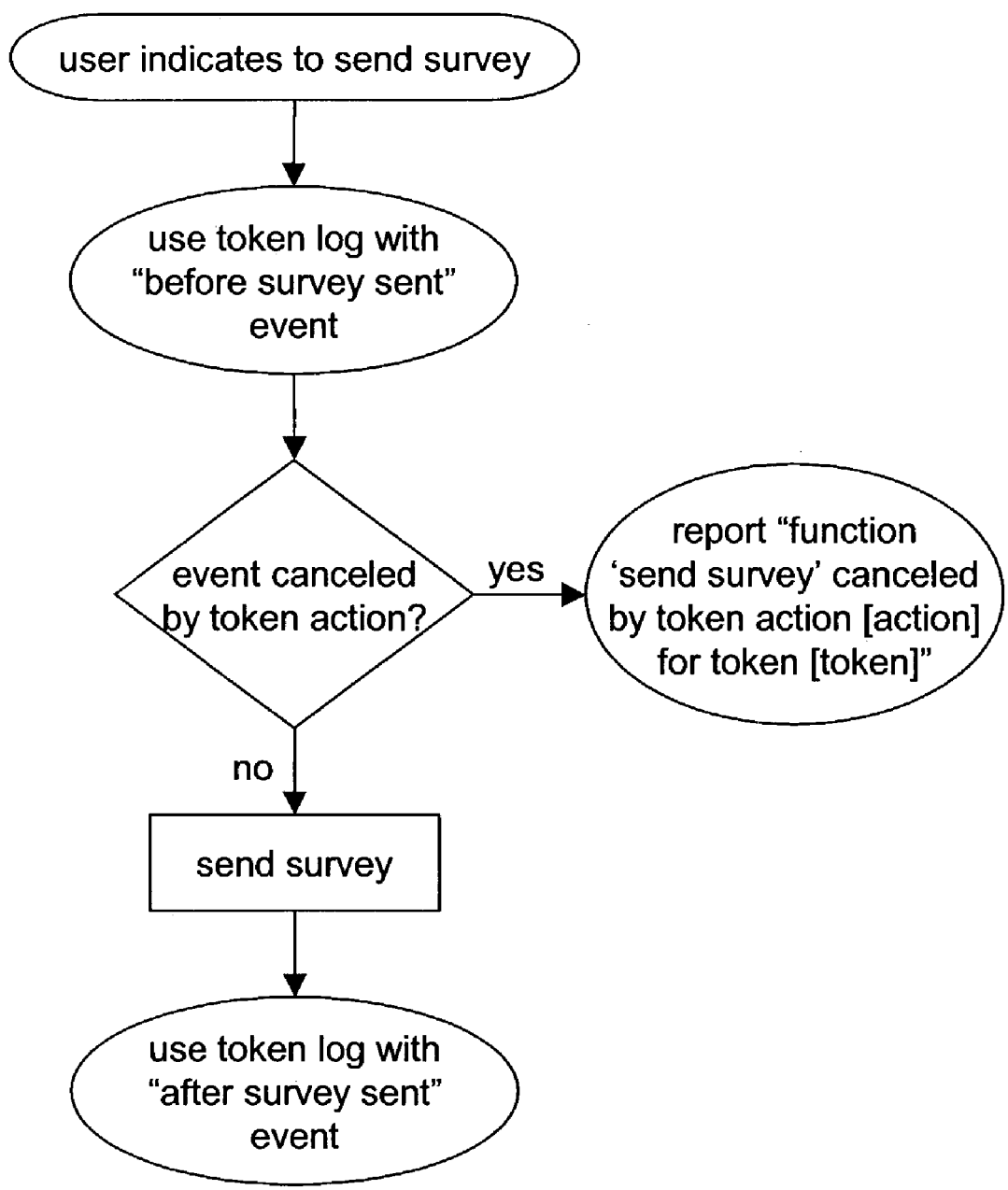
FIG. 6 is a flowchart of a procedure for sending a survey.

As another "Function Initiated" example, FIG. 6 shows the TLM action to be taken if a survey is being sent by a token issuer's message device. In this case, the event is a message event, with the message being the survey. The survey may be sent with a new token or a previously issued token. That token action log may specify actions for the attached token corresponding to the function "before survey sent," such as to record that the survey is being sent in some list of survey subjects. The token action log might also specify that after the survey is sent with that token the copy of the sent message should be deleted from the sent-items mail box.

Figure 7:
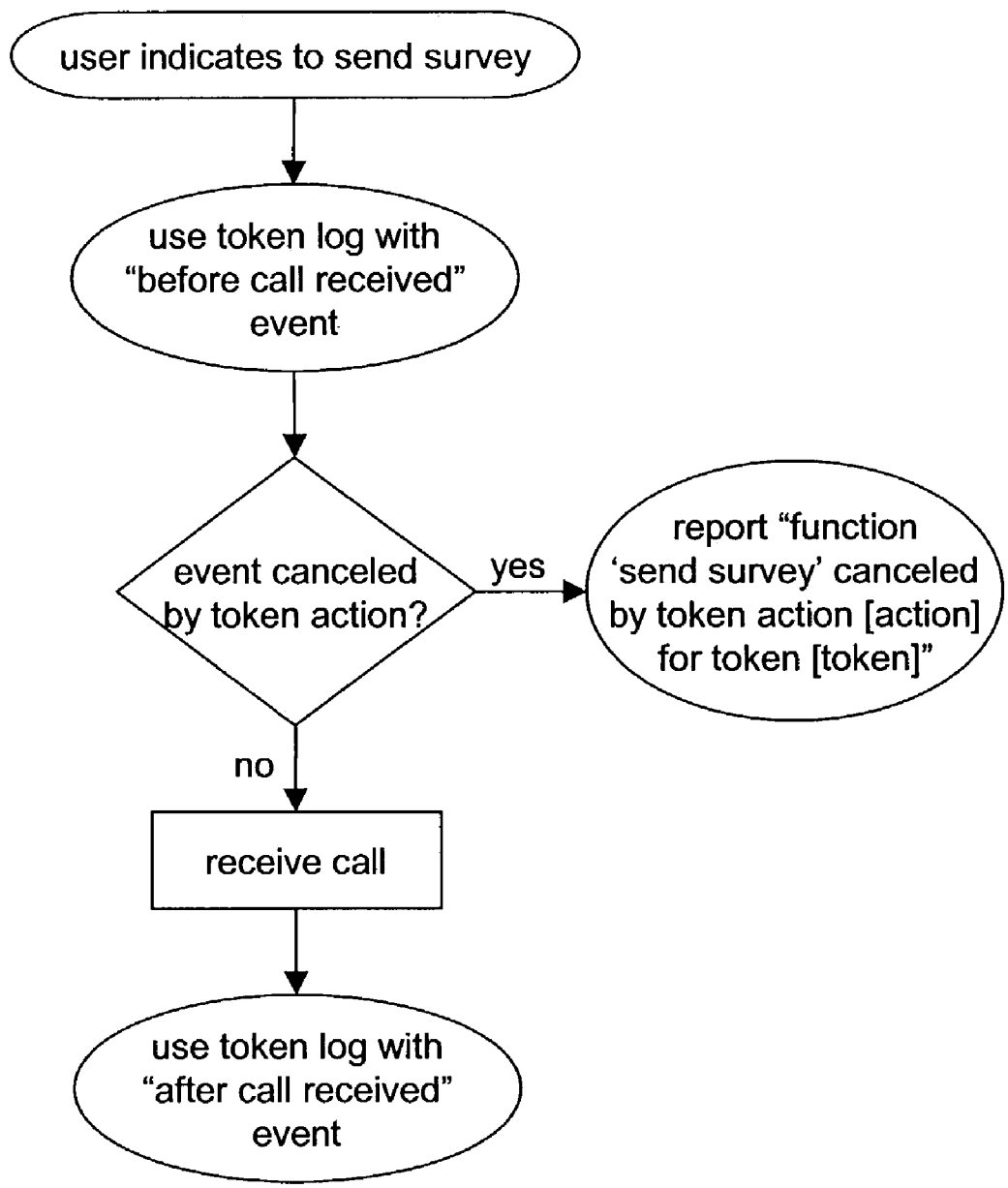
FIG. 7 is a flowchart of a procedure for receiving a call.

As another "Function Initiated" example, FIG. 7 shows the TLM action on a telephone device when a call comes in. In this example, the incoming phone call is the "message" being processed. The TLM checks the token action log before the call is received (i.e. before it is passed through to the answerer), as well as after it is received. The "function" is receiving an incoming call. The presence of tokens accompanying the incoming call may trigger such token action log actions as loud ringing of important calls, forwarding of calls to other numbers, or playing a prerecorded message to the caller.

Figure 8:
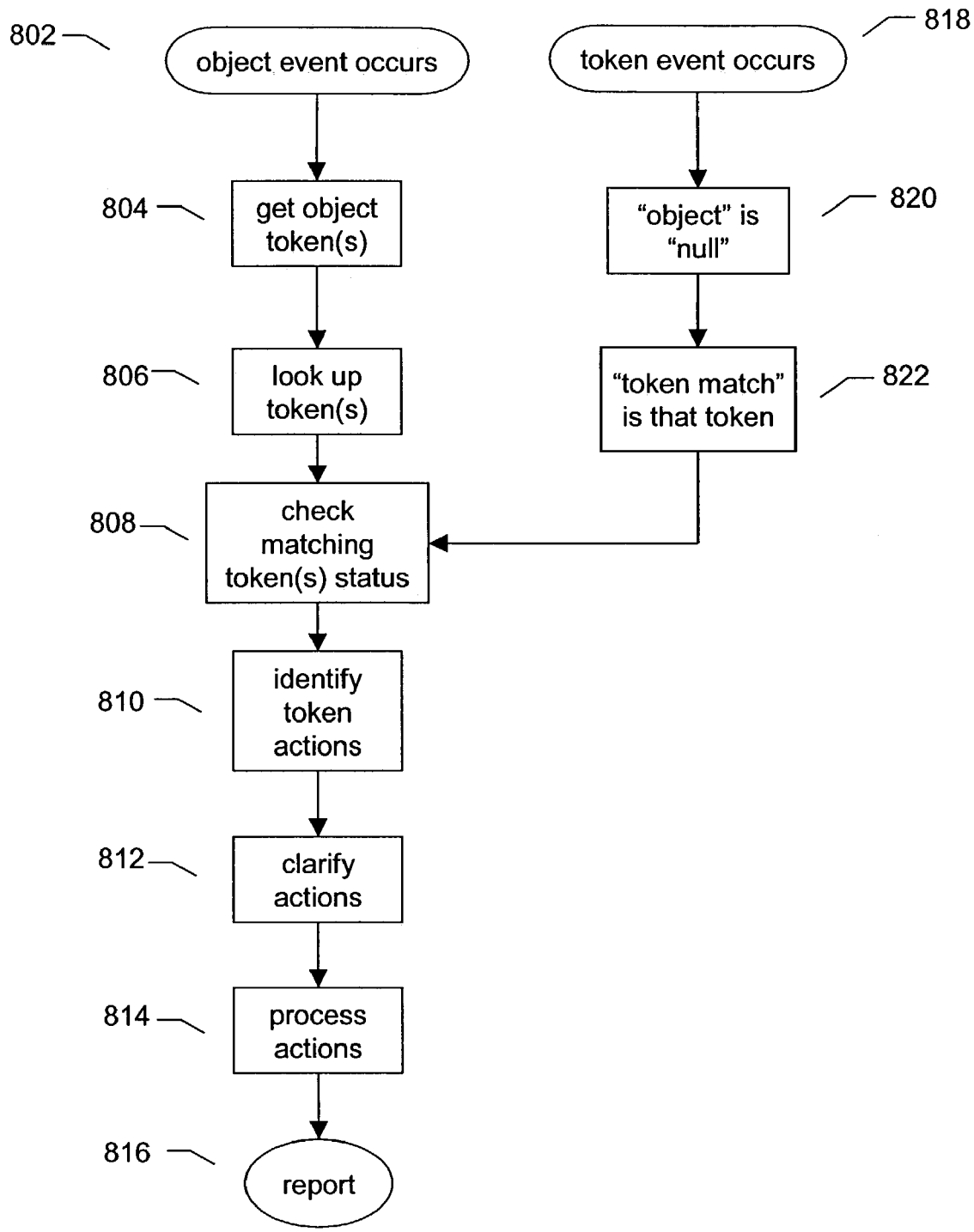
FIG. 8 is a flowchart of a procedure for using a token action log.

Referring to FIG. 8, there are two general classes of events involving tokens. The first is an object (such as a message) event which an event involving an object that may have one or more tokens attached. Examples of message-object events include: "after message received," "after message replied," "before message deleted," etc.

The second is a token event which is an event involving a token record in a token action log, independent of any other object, which is called a "token event." An example will be given below.

If an object event occurs 802, the object (such as a received message) with any attached tokens are sent to the TLM. The TLM extracts any token(s) attached to the object 804. Then, the TLM looks up the token(s) in the token action log(s) 806. The TLM checks any matching tokens to see if they are expired or not 808, then identifies relevant actions 810. The TLM clarifies the relevant token actions to be performed, as necessary 812. The resulting actions are processed 814. Finally, the outcome is reported to the token issuer, as desired 816.

As mentioned, it is possible that an event occurs that involves a token itself, but no other object 818. For example, if a token issuer attempts to delete a token, the event "before token deleted" occurs. In this case, the TLM is called with no other object except for the token (or tokens) itself. The "object" is "null," meaning there is no object 820. The TLM does not need to get the token 804, since the token is already determined. Instead, the token is assumed to be the given token, which is looked up in the token action logs 822. Otherwise, the procedure continues as usual with checking the token match for validity 808, etc.

The range of possible events triggering the use of a TLM is as wide as the range of possible applications. The events are typically affiliated with functions of the system of application. An event "before [function]" might occur before a function is performed, and an event "after [function]" might occur after the function is performed.

As an example, an email system might have "before . . . " and "after . . . " events corresponding to the following types of functions:

message accepted—a new message is received and accepted.
   message deleted—a message is deleted.
   message filed—a message is moved to a folder.
   message replied—a reply is given to a received message.
   message printed—a given message is printed.
   message archived—the message is copied to an archive location.

Any functions of any object processor could trigger an event of relevance to the TLM.

Figure 9:
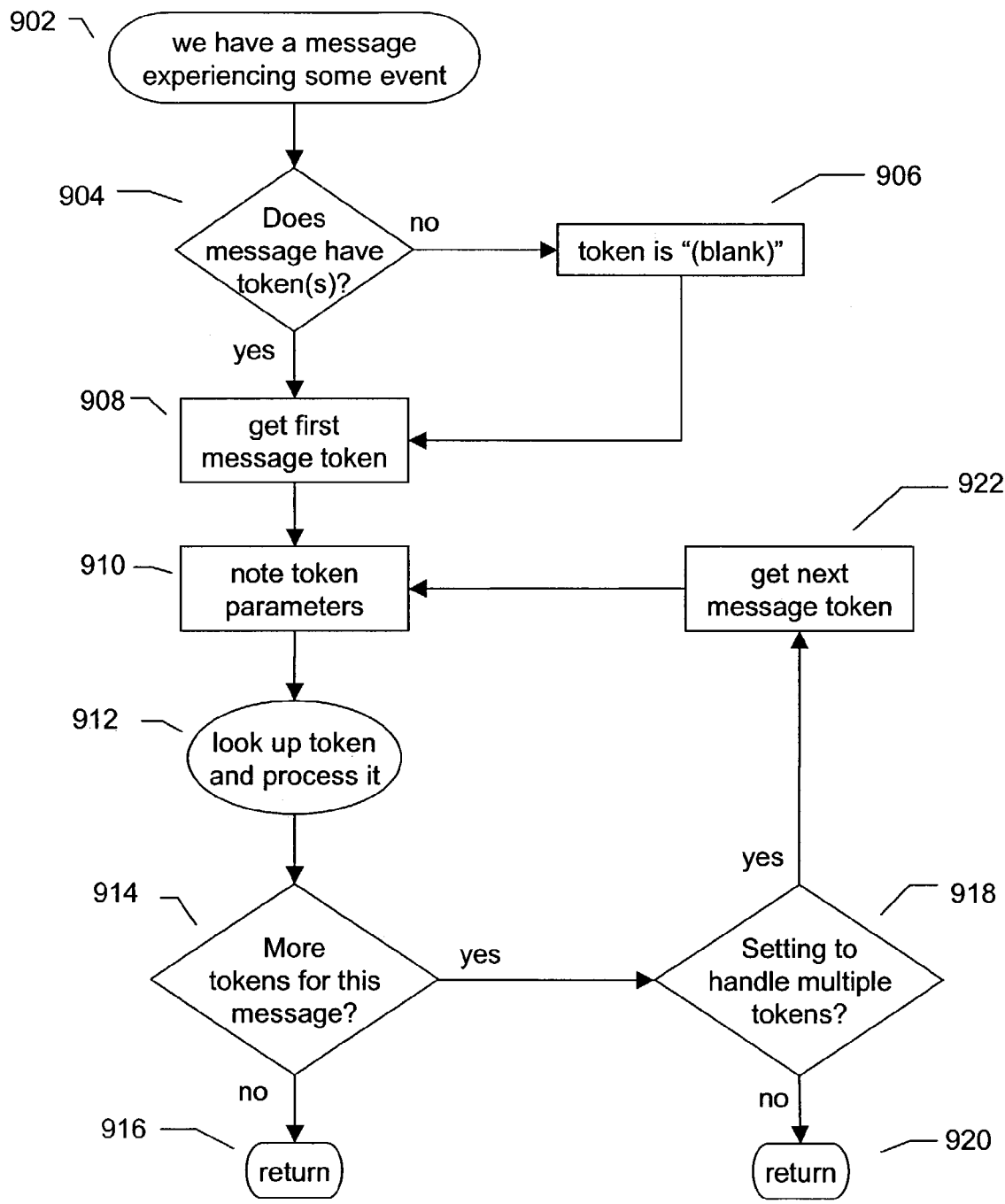
FIG. 9 is a flowchart of a procedure for obtaining tokens from messages or other objects.

FIG. 9 is one embodiment of the "get object token(s)" procedure 804. This and subsequent figures consider the "object" being a "message," even though the object could be something besides a message. Without loss of generality, the term "object" or the name of another object could be substituted for "message" in this and subsequent figures.

A message (again, this can be read "object") experiences some event, causing this procedure to be called 902. The message is checked to see if it has one or more tokens 904. If no token is found attached to the object 904, then the "token" is considered to be "(blank)" 906. A "(blank)" token is a token designated to match for messages that have no token. This allows us to look up relevant actions for messages that have no token attached.

If there are more than one token attached to the message, then it may be necessary to consider each. We begin with the first token present 908. In the case of a "(blank)" token, the first message token is that "(blank)" token. Each token may include parameters 910, which should be noted by the TLM in case they are needed in processing the actions of the token.

We then look up the token in the token action log(s) and process the relevant actions 914, which is detailed in subsequent figures. If there are no more tokens with this message 914, the procedure ends 916. If there are more tokens, the token issuer (i.e. the person configuring the TLM) may have set a setting to not handle multiple tokens 918, in which case the procedure ends 920. Otherwise, the next message token is retrieved 922 and the procedure repeats by cycling at the point of noting the subsequent token's parameters 910.

In many applications, it is sufficient for a token user to include one of the token issuer's tokens with a given message. However, other applications may benefit from multiple tokens being sent. The means for dealing with multiple tokens can vary, depending on the implementation. Alternatives include:

The tokens can be processed in the order the appear in the sender's message.
   The tokens can be processed in an order based on a priority indicated in the receiver's token action log.

Figure 10:
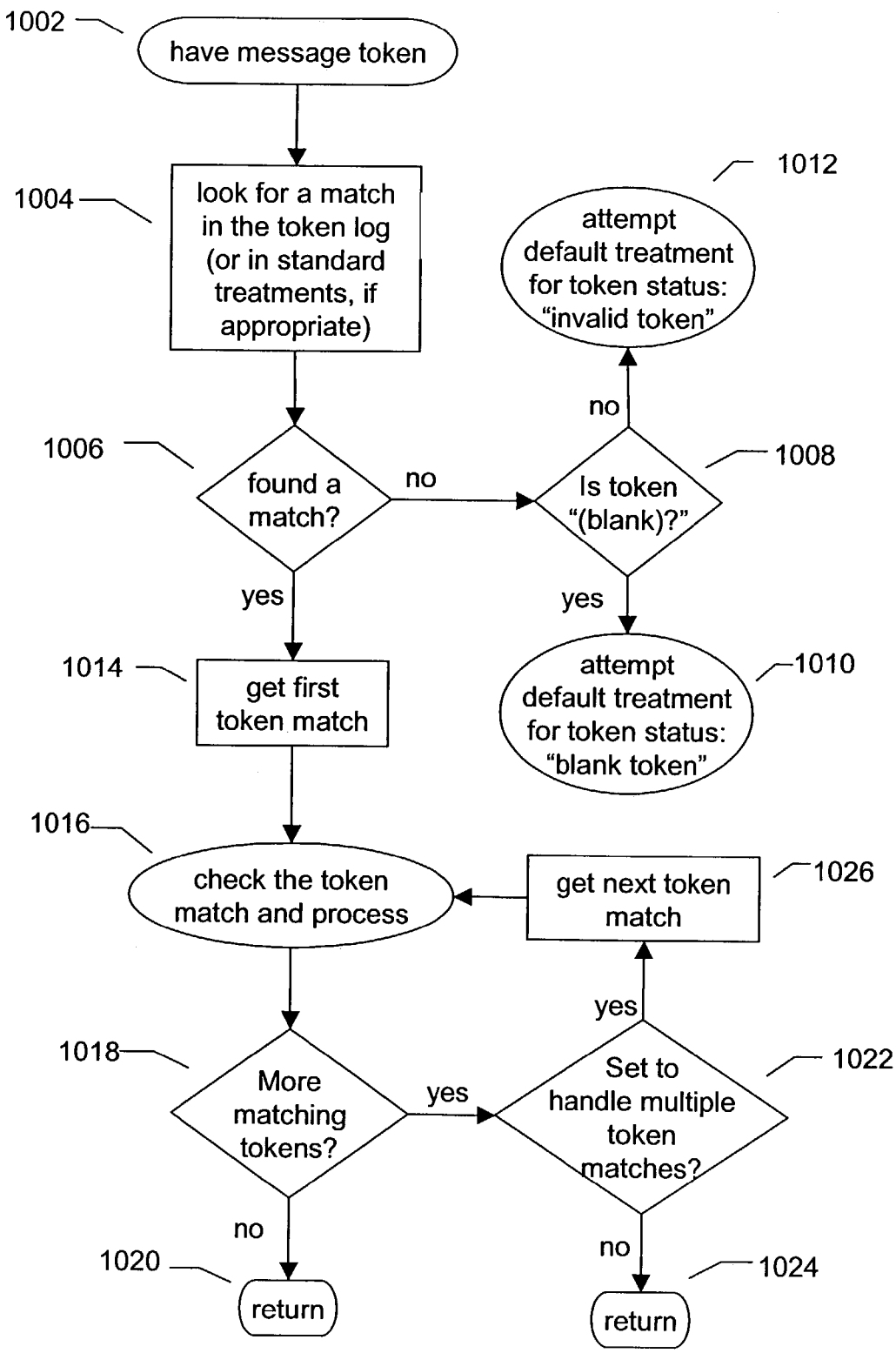
FIG. 10 is a flowchart of a procedure for looking up a token in a token action log.

FIG. 10 is one embodiment of the "look up token(s)" procedure 806. The procedure of FIG. 10 is called when a token has been identified and the token needs to be looked up in the token issuer's token action log(s). We begin this procedure by having a identified token 1002 that needs to be looked up in the token action log(s). (Or the "(blank)" token meaning no token was attached to the message.) We look in the appropriate token action log to see if the token exists there 1004.

In one embodiment, a TLM may have multiple token action logs. A TLM will typically have one (or more) primary token action log(s), and at one (or more) "Standard Treatments" log. "Standard treatments" is a token action log that defines actions for classes of tokens, rather than for individual tokens. Of course, a "Standard Treatments" log need not be implemented as a token action log.

For example, as shown in FIG. 26, standard treatments may contain an entry for "important" that treats messages as important. The "token" in the standard treatments file may be the "treatment" name (e.g., "important"). One valuable "treatment" is "default" which specifies default actions for messages tokens that have no actions for a specific event and/or token status defined. Therefore, if this procedure is to look use "standard treatments" as the token action log, then the specific treatment name is used as the "token" to search for.

The following is an example of standard (default) treatment for a personal email client. For sake of the example, we assume the action entries for each given token in the token action log take the following form:

```
event 1 ###
       (default actions for event 1)
   [[[token status 1]]]
       (actions for event 1 token status 1)
   [[[token status 2]]]
       (actions for event 1 token status 2)
   ...
event 2 ###
   ...
```

As such, a default treatment entry for an email system might be the following:

```
after message received ###
    [[[valid token]]]
        decrease (token,uses);
        accept;
    [[[expired token]]]
        reply (expired);
        reject;
    [[[blank token]]]
        if_match (subject,/ˆrequest.*?token/);
            prompt ({from} requesting token: {subject});
            reply (issue);
            reject;
        else;
            reply (suggest);
            reject;
        end_if;
    [[[invalid token]]]
        reply (invalid);
        reject;
after message displayed ###
    set (read, yes);
```

The reply actions refer to standard form-messages that are sent, such as the following:
  reply(expired)—sends "The token you sent is expired. Please contact the person by other means if you need a new token . . . ."
  reply(issue)—creates a new token and sends "The this person has issued you a token 'abc123' that you should send with future correspondence.
  a reply(suggest)—sends "This person uses a token email system that requires you to include a token when you send messages. To obtain a token, send a message with the subject line 'requesting a token . . . ,' and . . . ."
  reply(invalid)—sends "The token you sent is invalid. If this is in error . . . ."

This is a simple example, and is meant to illustrate default token behavior for one application of TLM system.

A "token match" is an entry in a token action log that matches the given token. That means that it matches not only the token (or, in the case of standard treatments, the treatment), but also other conditions such as a pattern for the message sender's email address. This allows the token action log to require tokens to only be valid if they appear to be coming from specific senders or domains.

Referring to FIG. 10, if the token is not found in the token action log 1006, then the TLM checks to see if the token is "(blank)," meaning there was no token attached to the message 1008. If the token is "(blank)" then the TLM attempts to initiate a default treatment for this token given the token status "blank token" 1010, which is detailed in a subsequent figure. If the token is not blank, then the TLM attempts to initiate the default treatment for that token given the token status "invalid token" 1012.

In one embodiment, when the TLM considers a token attached to an object (or an independent token), it determines the token status. A number of status values are possible within the scope of the invention:
  blank token—since no token is attached to the message being process the (blank) token is considered, and the (blank) token is valid.
  invalid token—the token (blank or non-blank) was not found in the token action log.
  expired token—the token (blank or non-blank) was found in the token action log, but it was expired.
  valid token—the token (blank or non-blank) was found in the token action log, and it was not expired.
  misused token—a non-blank token that exists in the token action log but does not meet basic conditions for use.
  expired token—a non-blank token that exists in the token action log but is expired.
  invalid blank token—a blank token with no blank token entry in the token action log.
  misused blank token—a blank token that exists in the token action log but does not meet basic conditions for use.
  expired blank token—a blank token that exists in the token action log but is expired.
  valid blank token—a blank token that is found in the token action log and meets all criteria for use (and is not expired).

There may be other specific token states representing specific ways a given token could be invalid. A general approach would be to have two primary token status values: valid and invalid. Then, there could be any number of secondary token status values for invalid tokens, specifying why the token is considered invalid, e.g.:
  invalid: not found—token not found in the token action log
  invalid: bad user—token being used by an authorized user
  invalid: expired date—the token expiration date has passed
  invalid: expired uses—the token uses is less than one An advantage of that token status scheme is that it can easily employ wildcard characters in the token actions recorded in the token action log. For example, a given token action log entry might specify one action for invalid tokens due to an expired date (such as sending a message about when that expiration date was) and another action for all other invalid token status values. The token action log might include a first action entry (for the given function event) for "[[[invalid: expired date]]]" and a subsequent action entry for "[[[invalid: *]]]" where "*" is a wildcard indicating any match. (So-called "regular expressions" could also be used.) If the TLM system is configured to only act on the first matching action for a given token, then this setup of token actions will accomplish the desired system behavior.

Further, the token status could be multi-dimensional. The token status could contain the following elements:
  validity=valid or invalid
  violation=reason(s) for invalidity
  presence=blank or non-blank.

Then, in the token action log the actions could be specified according to these elements, utilizing wildcards as desired (and default token status elements as appropriate). An identifier format in the token action log action could be [[[validity (violation) presence token]]], indicating action matches such as the following:
  [[[valid blank token]]] matches a blank token that is found in the token action log.
  [[[valid*token]]] matches a blank or non-blank token.
  [[[invalid (*) non-blank token]]] matches any invalid non-blank token.
  [[[invalid (expired date|expired uses)*token]]] matches any blank or non-blank token in the token action log that has an expired date or expired uses.

The appropriate token status value for a given token is determined by the procedures of the TLM. Whether such a more extensive list of possible token values would be beneficial depends on the context for TLM implementation.

In some cases, more than one entry in the token action log may match the given token. The TLM considers that possibility, and may begin with the first match 1014. A major action of the TLM is to check the token to assure it is not expired, and to process the relevant actions 1016, which is detailed in subsequent figures.

If there are no more matching entries in the token action log 1018, the procedure ends 1020. Otherwise, if the TLM administrator has set the TLM to handle not handle multiple matches 1022, the procedure ends 1024. If not, the TLM gets the next token action log entry match 1026 and repeats at 1016.

Figure 11:
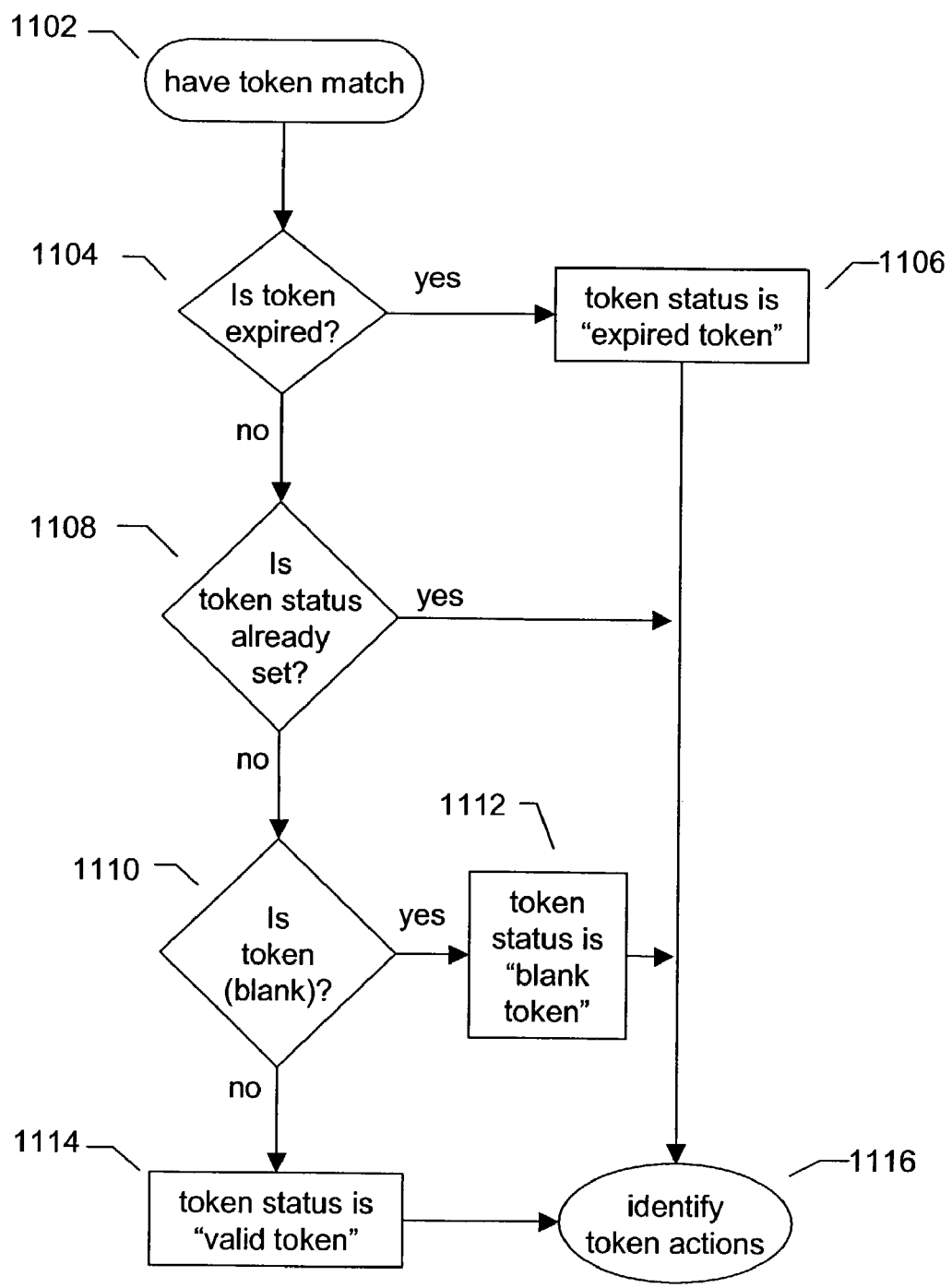
FIG. 11 is a flowchart of a procedure for checking a matching token to determine if it is valid.

FIG. 11 is one embodiment of the "check token match" procedure 808. Having a token match 1102 means that one or more entries in the token file matched the token under consideration (which could be a blank token or a non-blank token).

One purpose of the "check token match" procedure 808 is to determine whether the token has expired 1104, and to identify the correct token status. There are various ways a token can expire. For example, the expiration date on the token may have passed. Alternatively, the token may be authorized for only a set number of uses, and which number has been exceeded.

If the token match is expired by any expiration criteria, the token status is "expired token" 1106 and we go to the procedure to identify appropriate actions for that token status 1116 which is detailed in subsequent figures. If the token match does not meet expiration criteria, then we either leave the token status as it is 1108, or, if the token status is not set, we set the token status to the appropriate valid value. If the token is blank 1110, then the token status should reflect that the token is blank 1112. Note that a token status of "blank token" has the meaning "blank token that is valid (i.e. found in token action log and not expired)." If, however, the token is not blank, then the token status becomes "valid token" 1114, which has the meaning "non-blank token that is valid (i.e. found in token action log and not expired)." Regardless of the token status, the procedure proceeds to identify and process token actions 1116.

Figure 12:
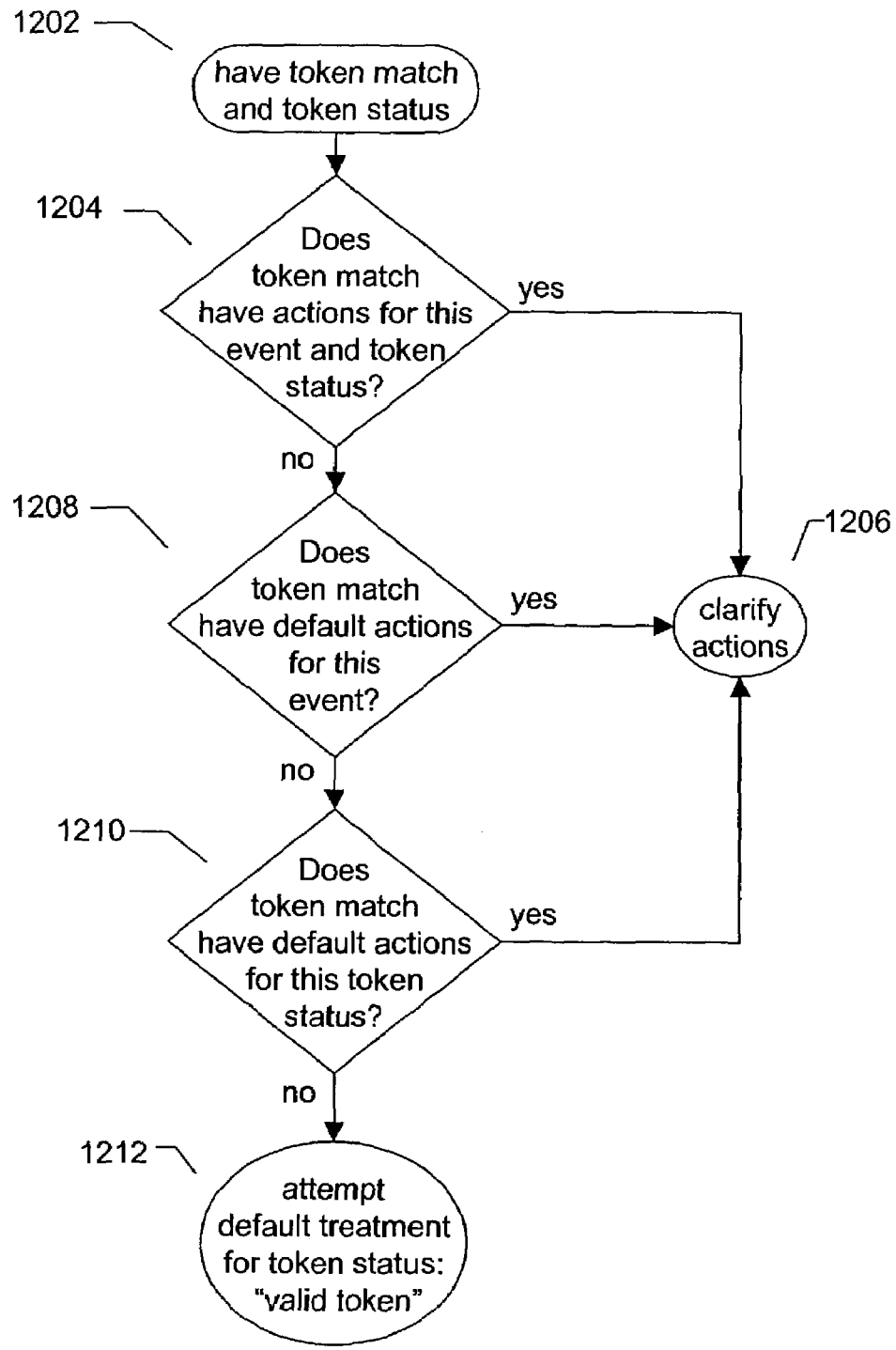
FIG. 12 is a flowchart of a procedure for identifying relevant actions for a given token.
Figure 13:
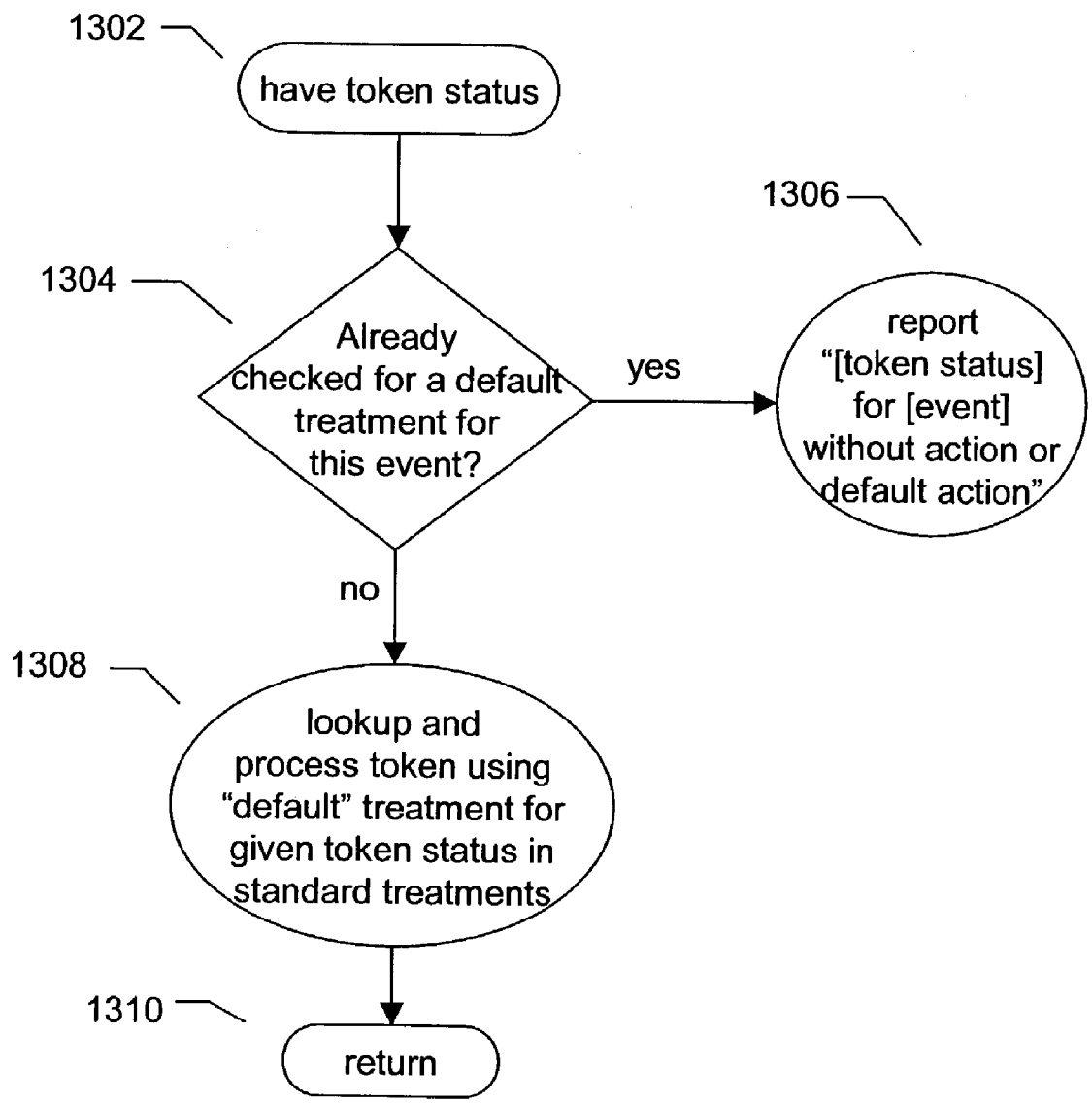
FIG. 13 is a flowchart of a procedure for identifying a default treatment where no action is otherwise specified.

FIG. 12 shows one embodiment of the "identify token actions" procedure 810 and proceeds from step 1116 of FIG. 11. A purpose of this procedure is to identify an action set for the given event and token status. This includes looking for default actions, where appropriate.

A first possibility is if the token match itself contains actions for the given event and token status 1204. If there are actions defined in the token match, then we proceed to the next procedure to clarify then process the actions 1206.

If the token match does not have actions defined for the given token match, there is still the possibility of default actions. First, the TLM can look for default actions for the given event 1208, which are invoked regardless of the token status. If none are found then the TLM can look for default actions for the given token status 1210, regardless of the event. Note that these last two steps can possibly be switched, should the system designer prefer to have token status take precedence over event in searching for default actions.

If none of those default actions are found in the given token action log, the procedure might still look for a default action in the "standard treatments" token action log 1212, which is described in the next figure.

This procedures may be called from the prior procedure 1302 if it is desirable to check the "standard treatments" token action log for default actions. Since the prior procedure may already be looking in the "standard treatments" token action log, there may be a need to abandon this search 1304 to avoid infinite recursion. In other words, if no default treatment was found in the "standard treatments" token action log, then options for default actions have been exhausted, and the TLM may report such 1306.

If the TLM has not already checked for a default treatment in the "standard treatments" token action log, then it can look for such simply by calling the "look up token" procedure (described in a prior figure), specifying to look in "standard treatments" for the "default" treatment. Again, that is the last resort, so the TLM returns after that attempt 1310. This "return" means to return an indicator as to whether or not the relevant token action resulted in canceling the action. As used herein, the term "return" is used in a computer programming sense—to finish a sub-process and return to the calling process.

Figure 14:
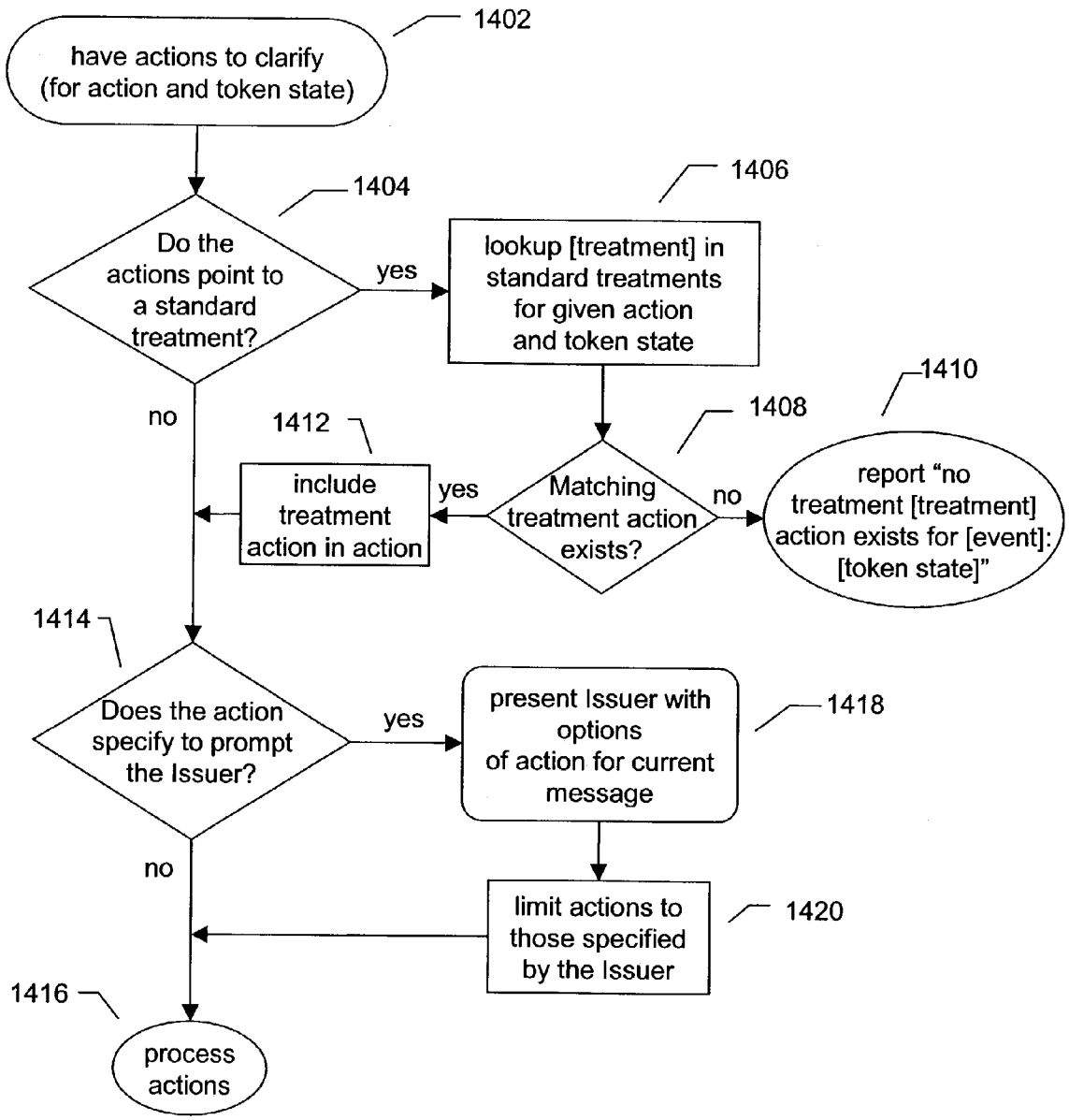
FIG. 14 is a flowchart of a procedure for clarifying which specific actions should be executed.

FIG. 14 shows one embodiment of the "clarify actions" procedure 812. In one embodiment, certain actions may point to other actions. For example, the actions may point to a standard treatment 1404. If they do, then we will use the relevant actions from the "standard treatments" token action log which correspond to the given treatment 1406. In one implementation, we keep track of which treatments have been called for the given token, so that a treatment does not inadvertently wind up calling itself and thus causing infinite recursion. One method is to prevent entries in the "standard treatments" file from calling other standard treatments.

If a standard treatment is specified, but a match cannot be found for that treatment in "standard treatments," then this is a problem that might be reported 1410. If the standard treatment is found 1408, then that standard treatment action is used as appropriate 1412.

Another purpose of the FIG. 14 procedure is to allow for the possibility of a token issuer (i.e. the person whose device has the TLM system) prompted actions 1414. If the issuer has specified to be prompted for actions, then the action set to be performed 1420 is limited by the indicated preferences of the issuer 1418. Whatever actions result from this clarification are then processed 1416, which is detailed in the subsequent figure.

Figure 15:
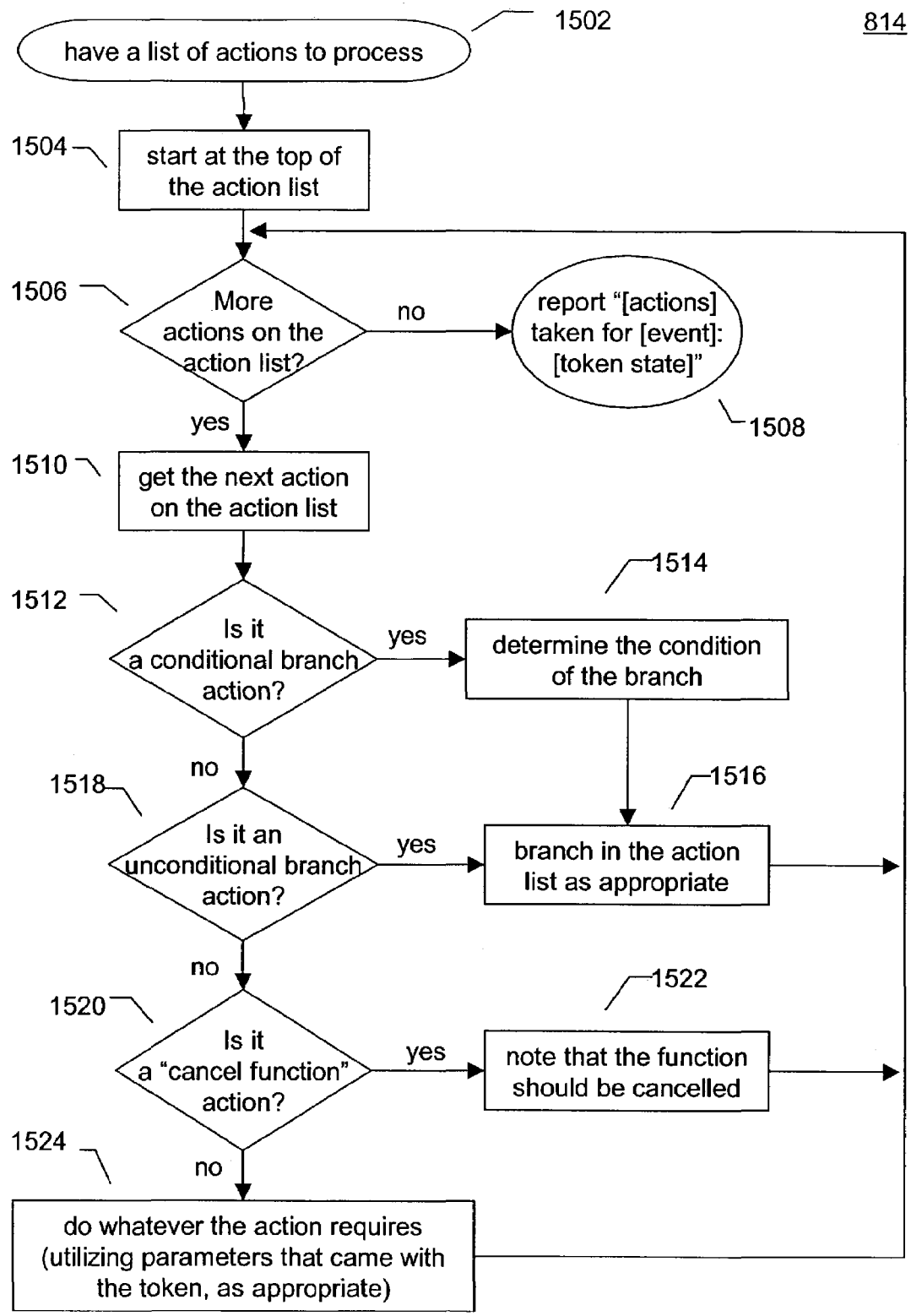
FIG. 15 is a flowchart of a procedure for processing the appropriate actions.

FIG. 15 corresponds to the "process actions" procedure 814. The procedure begins with a list of actions 1502, such as obtained from the procedure of the prior figure. Since there may be multiple actions, we start at the top of the action list 1504. If there are no more actions on the list 1506 then we are done and can report what happened 1508.

If there are more actions to be processed, we get the next action on the list 1510. If it happens to be a conditional branch 1512, we determine the condition that causes the branch 1514 and branch as appropriate 1516. An example of a conditional branch is "if the message has an attachment then save the attachment, otherwise skip the save-attachment command." (The verb "branch" is used in the programming sense: to proceed with a different command in the action list.) If it is an unconditional branch action 1518, the branch is taken 1516 without the need to check a condition.

As another example of a special action, the TLM considers if the current action is a "cancel function" action 1520, which means the function that initiated the event should not be performed. If such was the command, it is noted 1522, so that this information can be returned back to the calling procedure (and the function can indeed be canceled). Another special action not shown in this figure might be a "un-cancel function" action which would reverse the effect of a "cancel function" action (by resetting the note to cancel the function).

There could be any number of other actions that might be specified in a token action log entry. An example list is shown elsewhere in this disclosure. Generically, the actions are performed 1524. Note that the actions may possibly utilize parameters that came with the token and which were noted previously, or may utilize token conditions recorded in the specific token action log entry. This procedure repeats itself until all actions on the action list have been appropriately addressed.

Figure 16:
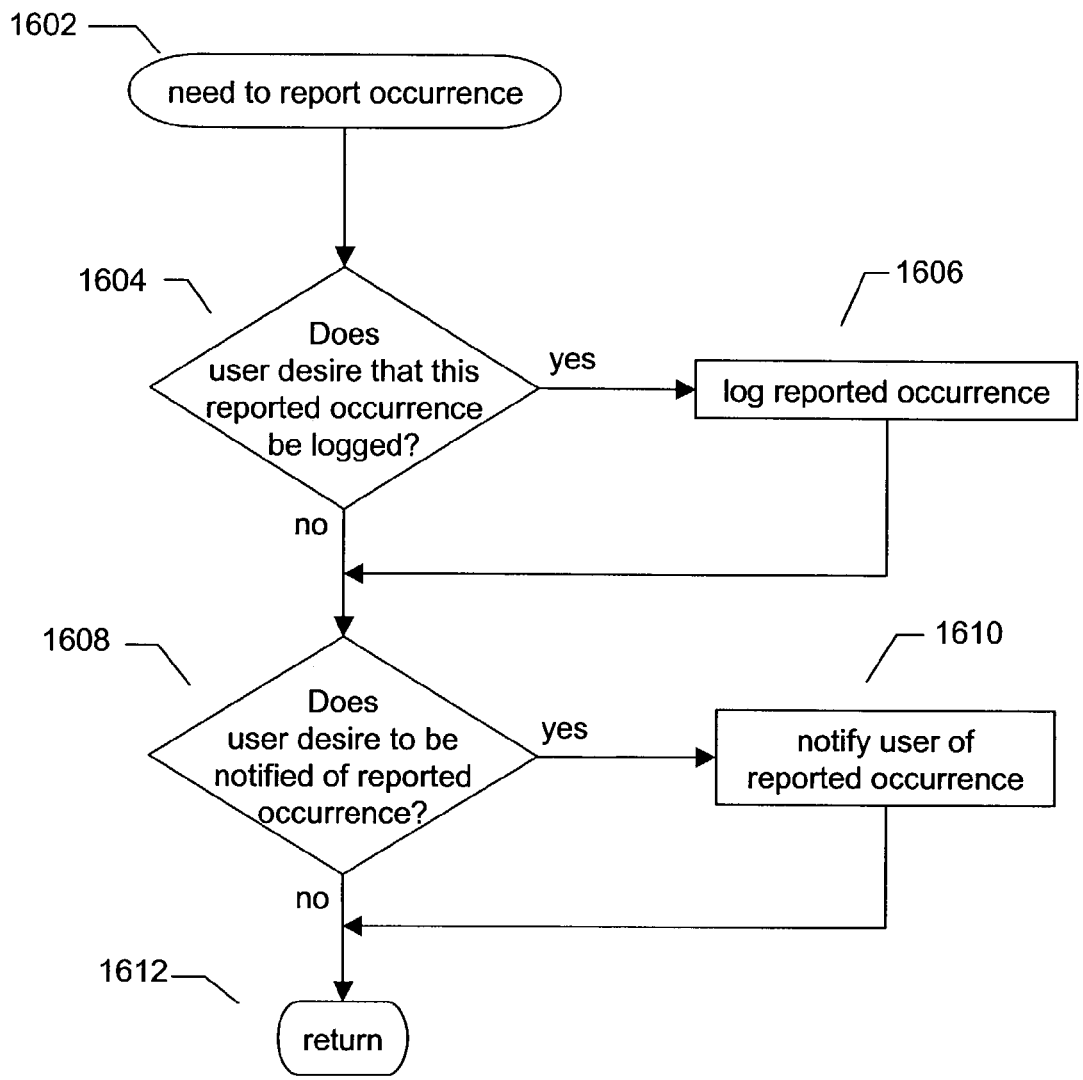
FIG. 16 is a flowchart of a procedure for optionally reporting and logging an occurrence.

FIG. 16 corresponds to the "report occurrence" procedure 816. This procedure provides for the opportunity of reporting any TLM occurrence that may occur. In one embodiment, the procedure begins by being given a specific occurrence to possibly report 1602.

Two possible ways of "reporting" are considered here, although there may be others. First, the occurrence might be logged 1604, which is to note the occurrence in some type of log file 1606. Second, the user (i.e. token issuer) might desire to be notified of this given type of occurrence 1608. For example, the TLM might notify the user 1610 by sounding a beep and displaying a message, etc. In other cases, no reporting is done.

After reporting the occurrence as desired, the procedure returns to the calling procedure 1612. As mentioned previously, this may include returning a flag or other indicator about whether the token actions specified to cancel the initiating function.

FIG. 17 describes one embodiment of a TLM system to filter email. The token issuer desires to request a price quote from a company, realizing that companies often use email addresses they receive to subsequently send unsolicited email (spam). Even worse, some companies sell email lists to other companies who use them to promote products. The token issuer desires to avoid these subsequent spam emails.

This is accomplished by issuing Company XYZ a token with a fixed number of times it can be used. The action for the token is shown in the top token action log of the figure. (The "uzp314" issued token is highlighted with an arrow.) The action for a valid token is to decrease the number of available token uses, to accept the message, and send a thank you auto-reply message. If the token is received after it is expired (i.e. after the first use), an appropriate "expired" message is sent and the message is rejected.

When Company XYZ returns the quote, it includes the token. Since the token still has one use, it is valid and the message is received. However, if the company sends spam including that token at some later time, the "number of uses remaining" condition in the token action log has already reduced to zero, and the spam is rejected.

As an extension, a person might issue "high priority" tokens to relevant message senders. The actions associated with receiving the token might include displaying the message in a bold font, causing an audible notification, paging the person, etc. If such sender includes that token with a message, those actions will be taken. Other possible applications to email are almost limitless.

FIG. 18 describes the use of a TLM system as a telephone filter. In this case, the token issuer desires Company XYZ to call him back by Aug. 10$^{th}$, 2002. This expiration is recorded in the token action log (under token 36314, highlighted with an arrow in the figure). Since this is an important call, the receipt of the valid token has action to ring the phone loudly.

If the company attempts to call the token issuer with that token after the token expiration date, the token status is registered as expired, resulting in an auto-reply message and the rejection of the call. Thus, calls from that company using that token are filtered after the token expiration date.

In a general application, people calling a cell phone might be required to include a token, which might simply be a numerical code in addition to the phone number. If a caller calls without including such a message token, the phone system can automatically notify the caller that a token is required. People calling from certain phone numbers can be allowed to pass without a token (i.e. with a blank token). Callers can request a token, which are issued at the discretion of the receiver. When a given token is received, special actions might be taken such as letting the call ring through to the receiver, playing a special ring melody, flashing a light, etc.

Figure 19:
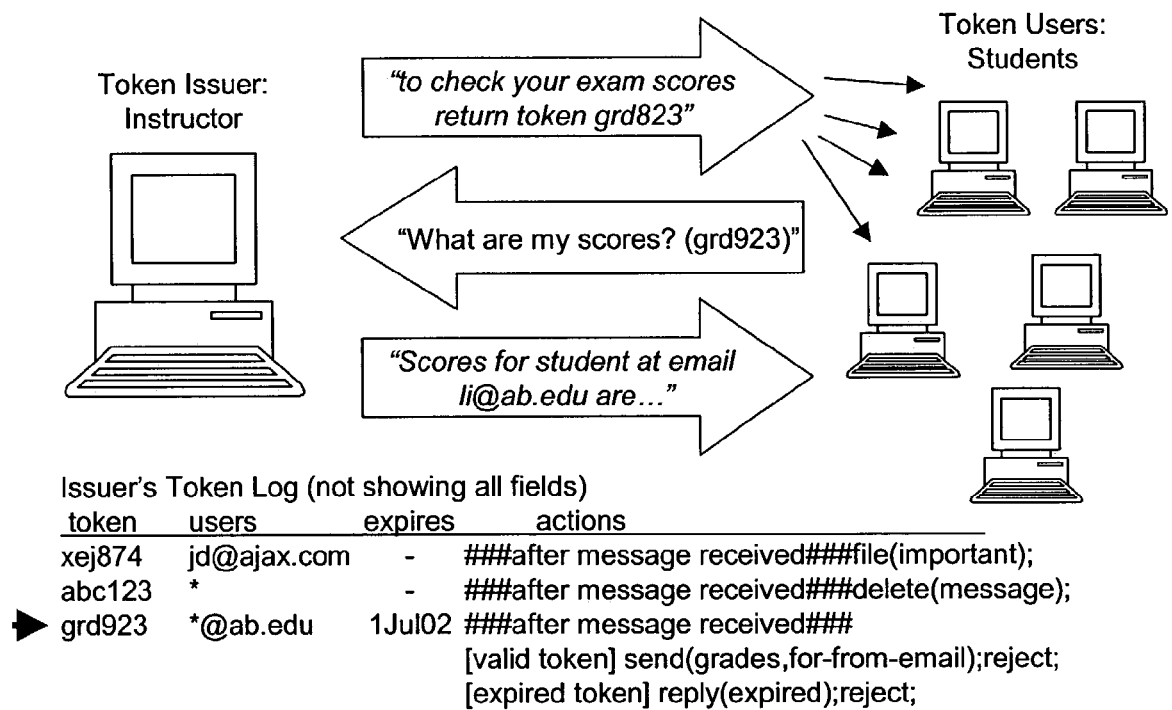
FIG. 19 is a dataflow diagram showing the use of a token action log in the context of course management.

FIG. 19 is an example application using token action logs in the context of course management. An instructor is teaching a course in which she will communicate with students via email. The instructor prints her email address in the course syllabus.

She also creates two tokens for the course. One is for general questions of possible interest to the entire class. Incoming messages (student questions) including that token will be automatically posted onto the class discussion forum. Outgoing messages (instructor answers) with that token will also be posted onto the class discussion form. The second token is for student-specific issues. Incoming messages with that token will "beep" the instructor and be automatically filed in a "course in-box." These two course tokens are also listed in the course syllabus, and students are instructed to use one or the other in any email being sent to the instructor.

The instructor can allow the token to be sent from any email address at any domain, or she can restrict it to the university domain. Also, she can flag that the tokens are only valid through the end of the semester—after that time the senders could be automatically sent a "this token has expired" message.

Figure 20:
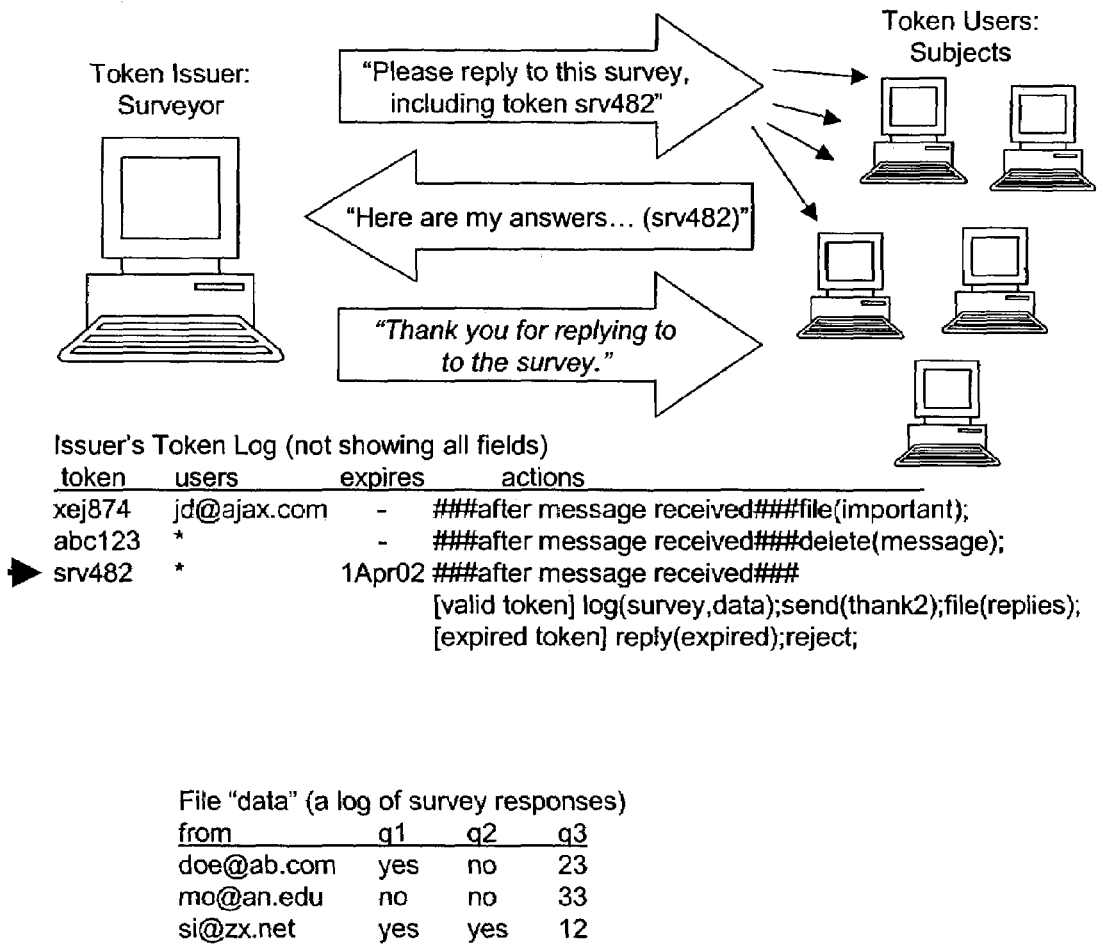
FIG. 20 is a dataflow diagram showing the use of a token action log in the context of a survey logger.

FIG. 20 shows an automated survey logger application example. It utilizes an action called "log" that logs results in a survey log file.

A surveyor may desire to survey others via email. A token might be created with an action for messages received of automatically logging the survey responses in a data file. The surveyor then emails the survey form to the survey subjects with that token included with the "reply to" address. The subject completes the survey and emails it back to the surveyor. The surveyor's email system recognizes that token and automatically parses the responses and records them in a survey response file.

Figure 21:
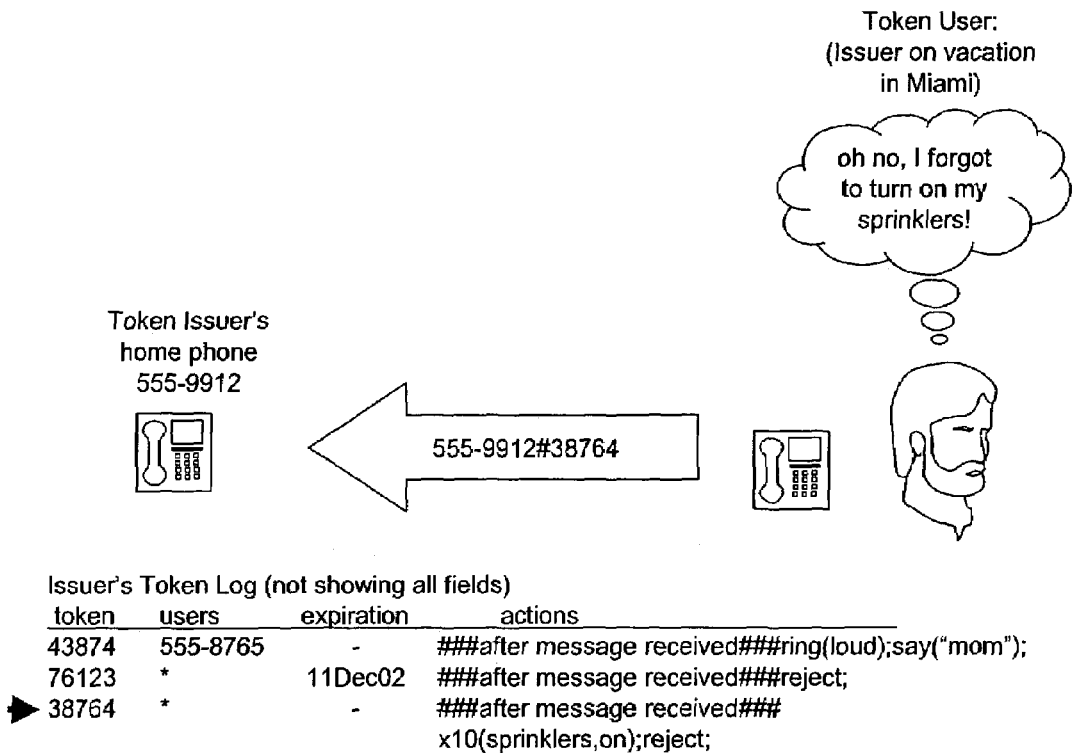
FIG. 21 is a dataflow diagram showing the use of a token action log in the context of remote sprinklers.

FIG. 21 is an example of a home control device utilizing a TLM. A person is going on an extended vacation, and does not know whether it will be necessary to run the automatic lawn sprinklers while he is gone. So, he creates a token in his home telephone's token system before he goes. The action for the token is to turn on the automatic sprinkler system when the token is received as part of a message. When he is on vacation he can check the weather of his home town in the newspaper. If it is necessary to water the lawn, he can call his home phone and include the special token—turning on his sprinkler system.

FIG. 22 is an example of a situation where a token issuer is the token user. In this case, a token is set so that it cannot be inadvertently deleted. The token event "before token deleted" has actions that prompt the user then cancels the function.

In view of the foregoing, the use of a token action log can be beneficial even Without communicating tokens with others. Tokens may be created by a user (and record in his or her token action log) that act as indicators of specific attributes of messages to which the tokens are attached. For example, a person may create ad hoc tokens that are recorded in the token action log with the action that objects or messages they are attached to cannot be deleted. When the user attempts to delete a message with such a token attached, the message device will detect the token, look up the action in the token action log for the event "before message deleted," and prevent the person from deleting the message. Therefore, the way to delete such a message would be to change the action of the token (recorded in the token action log) to allow deletion, to remove the token from the message before deleting it, or to delete the token from the token action log (which would instead motivate an "invalid token" response to that message).

FIG. 23 is an example of using a TLM in the context of a website trial. For this example, the message device is a company's web server. A token is distributed to customers on a document contained inside of the product packaging. When the token is initially submitted by the customer to the company's web server, the TLM in the web server recognizes that it is an invalid token, but is a valid product serial number. Thus, the default action becomes creating a new entry in the token action log for the given token with an expiration date 30 days into the future. For those 30 days, the person is considered to be a trial user of the website, and is thus authenticated to access the website features (by submitting that token at the website). After 30 days the person is not granted access to the website with that token, but is rather sent an automatic message encouraging her to send money to purchase a full subscription to the website services.

Examples 24 and 25 show the object not being a message, but being a non-message object. For the example of FIG. 24, the auto parts retailer desires to order parts from one of many wholesalers, and does not want to receive any items not ordered. When the order is placed, the token issuer includes a newly created token with the order. Of course, this token is recorded in the issuer's token action log. Subsequently, when an item is shipped from the wholesaler it should include that token. When the item is received and the token is validated, the system automatically initiates payment for the item.

If the wholesaler accidentally or knowingly ships an unordered part in the future, using the prior-used token or no token, the token issuer's TLM will recognize this problem and initiate return of the part. Thus, the TLM system prevents the token issuer from receiving parts that were not ordered.

Figure 25:
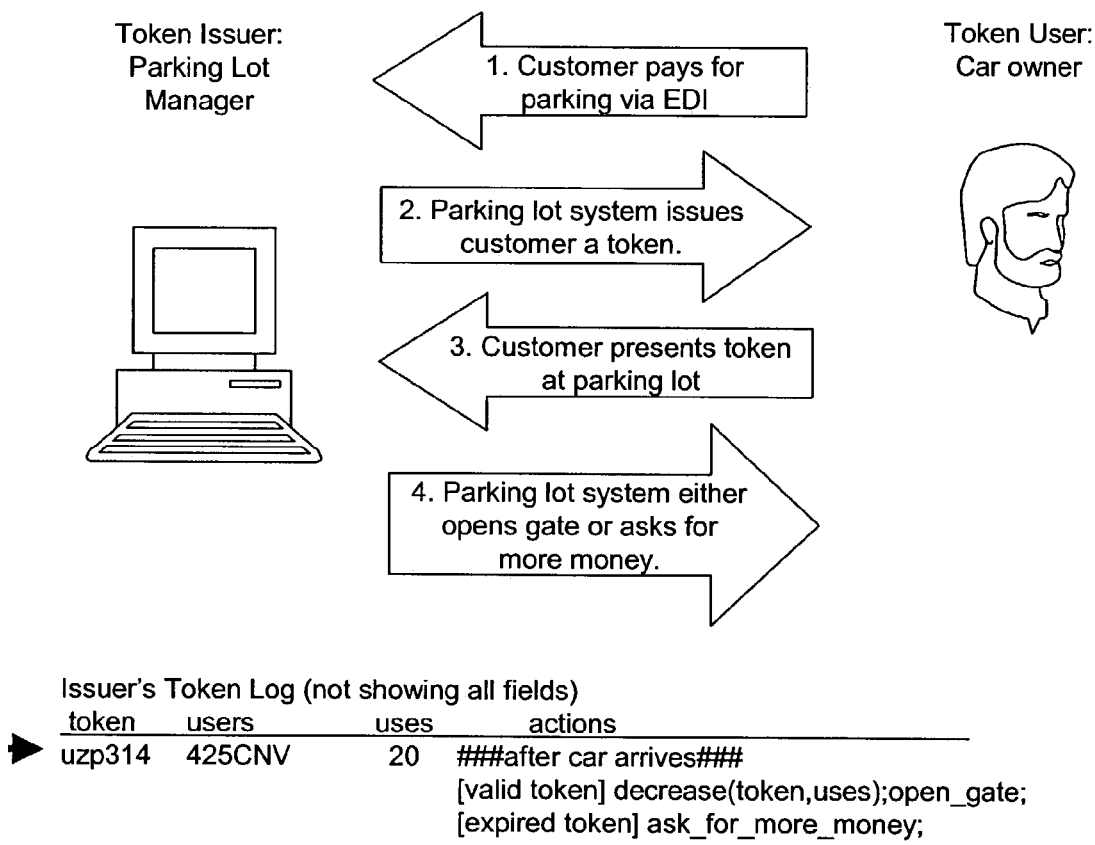
FIG. 25 is a dataflow diagram showing the use of a token action log in the context of parking control.

The example of FIG. 25 shows the non-message object being a car, or more particularly a token user in a car. The user purchases a "token" online, that allows him to enter the parking lot a given number of times. The parking lot gate contains a TLM that checks tokens entered by potential parkers. By entering a valid and unexpired token at the parking lot gate, the user is given access to the parking lot. If the token is not valid or is expired, the TLM restricts access to the parking lot, and may ask for more money.

This application of TLM systems to access control has similar application in many other areas including:

School lunch—kids prepay to get a token for lunches.
Gym membership—valid members have a token to enter the facility.
Automatic car wash—this example was describe earlier in this document.
Prescription refilling—doctors provide tokens with prescriptions that have limited use and are validated by EDI at the pharmacy.
Keyless hotel room locks—hotel customers are given a token that will open the room door during their stay. Other token-action log actions might include, for example, turning on the lights or adjusting the temperature according to the customer's preferences.
Rental car locks—conceivably a rental car could have a similar feature that only allows it to start with the token issued to the customer.
or other services that specific customers are allowed to use for specific times.

FIG. 27 shows a procedure for handling unsolicited email or other communications. For example, XYZ company may send an unsolicited email to a user having a TLM. Since the email does not include a token, the TLM finds a standard treatment in the token action log for a blank token. A number of example actions are illustrated.

In one embodiment, the TLM sends a reply to XYZ company stating that it must first request a token. The form of XYZ company's acknowledgement may be stipulated. For example, XYZ company may need to reply with a subject line beginning "requesting token:." In addition, XYZ company may be required to provide a statement of the purpose of the communication, e.g., "requesting a token to send you a recall notice."

An example procedure for requesting a token is shown in FIG. 28. In one embodiment, when the token request is received, the TLM may prompt the user to accept the communication. For example, the TLM may allow the user to (1) issue a token, (2) reject the communication, or (3) ignore the communication.

If the user accepts the communication, a token is issued and sent to XYZ company. Thereafter, XYZ company may send the original message with the token to the user, which may be accepted by the TLM into the user's inbox.

Conceivably, a spammer may configure an automated e-mail "robot" to send a token request with a bogus statement of purpose. To prevent this, the TLM may send a communication to XYZ company that includes an image depicting a code. The image may be embodied, for example, as a GIF or JPEG image. In one embodiment, the code may be any alphanumeric code that is readable by a human being. However, the code may be depicted within the image using an unusual font, shading, placement, and/or spacing to prevent optical character recognition (OCR). In one embodiment, an XYZ company representative may be required to visually discern the, code and include the code in its token request before a token is issued, effectively preventing fully automated spamming.

In one embodiment, a token may be automatically assigned to any communication that does not already include a token when received by a communication system or in response to another event. For example, a communication may be received having a return address that is in a TLM user's address book. Rather than requiring the sender to request a token as shown in FIG. 28, the sender's communication may be automatically given a token. This may be accomplished, in one embodiment, using a standard treatment. Tokens may be automatically assigned to communications in response to other conditions, which may be programmed by the token issuer.

Figure 29:
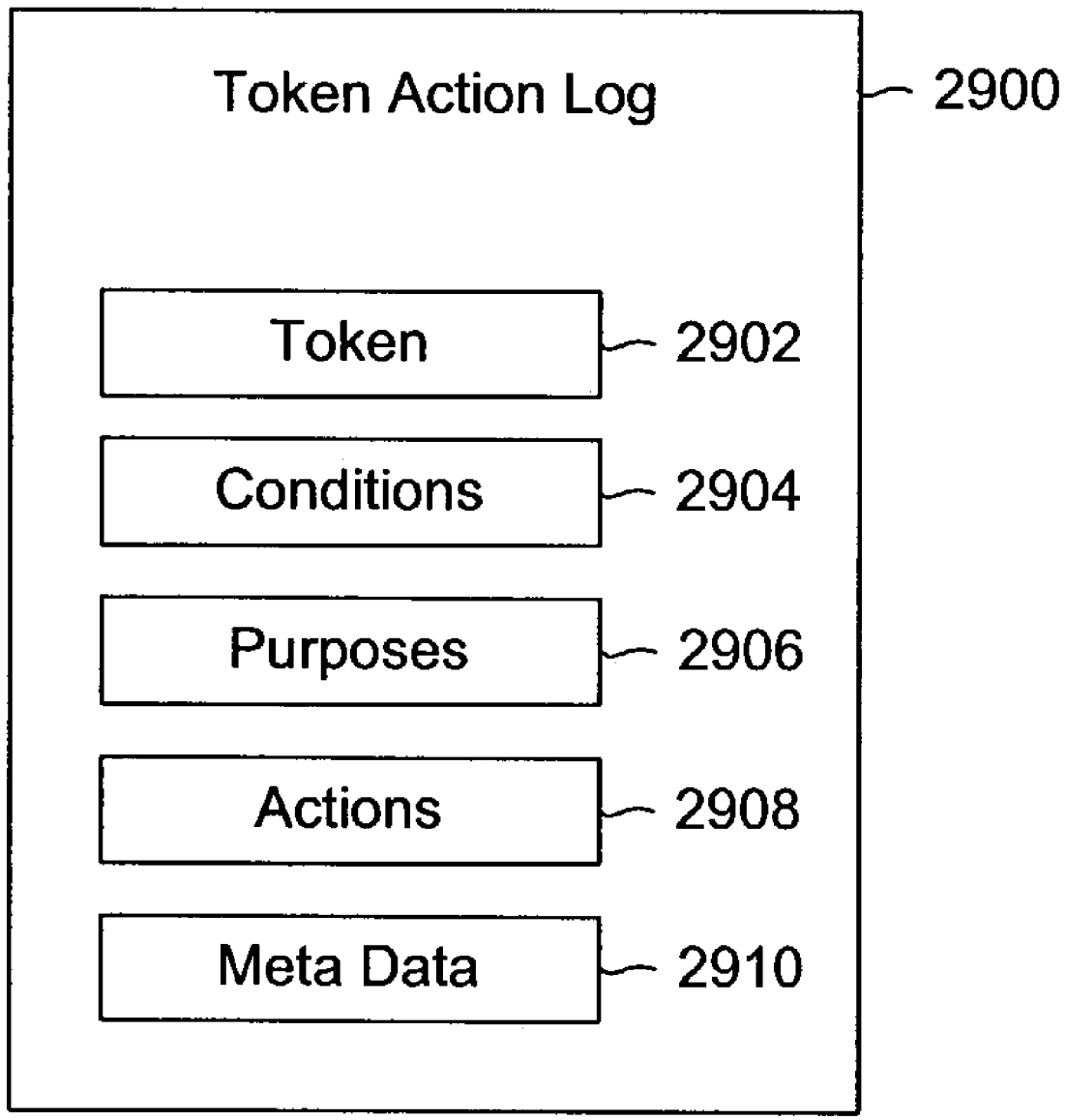
FIG. 29 is a block diagram of a token action log entry.

As illustrated in FIG. 29, a token action log 2900 may be embodied as a data table including the following types of information:

The token 2902 (or treatment, in the case of a standard treatments token action log), or a token pattern.
Conditions 2904 under which the token use is valid, such as an expiration date or a limit on the number of uses.
The purpose(s) 2906 of the token, including the intended purpose and/or the purpose communicated to the user.

Actions 2908 initiated by this token. The actions normally are specified according to function event and token state.

Meta data 2910 about the token 2902. Examples might include the create date of the token 2902 or a list of users this token has been sent to. It would also be valuable to include a date stamp indicating when the token was most recently used. That information would be helpful in identifying old token entries that might be cleaned out (removed or archived) from the token action log.

Of course, the token action log 2900 may be implemented using various types of data structures known to those of skill in the art. For example, the token action log 2900 may be embodied as an XML document, one or more tables in a database, or the like.

Figure 30:
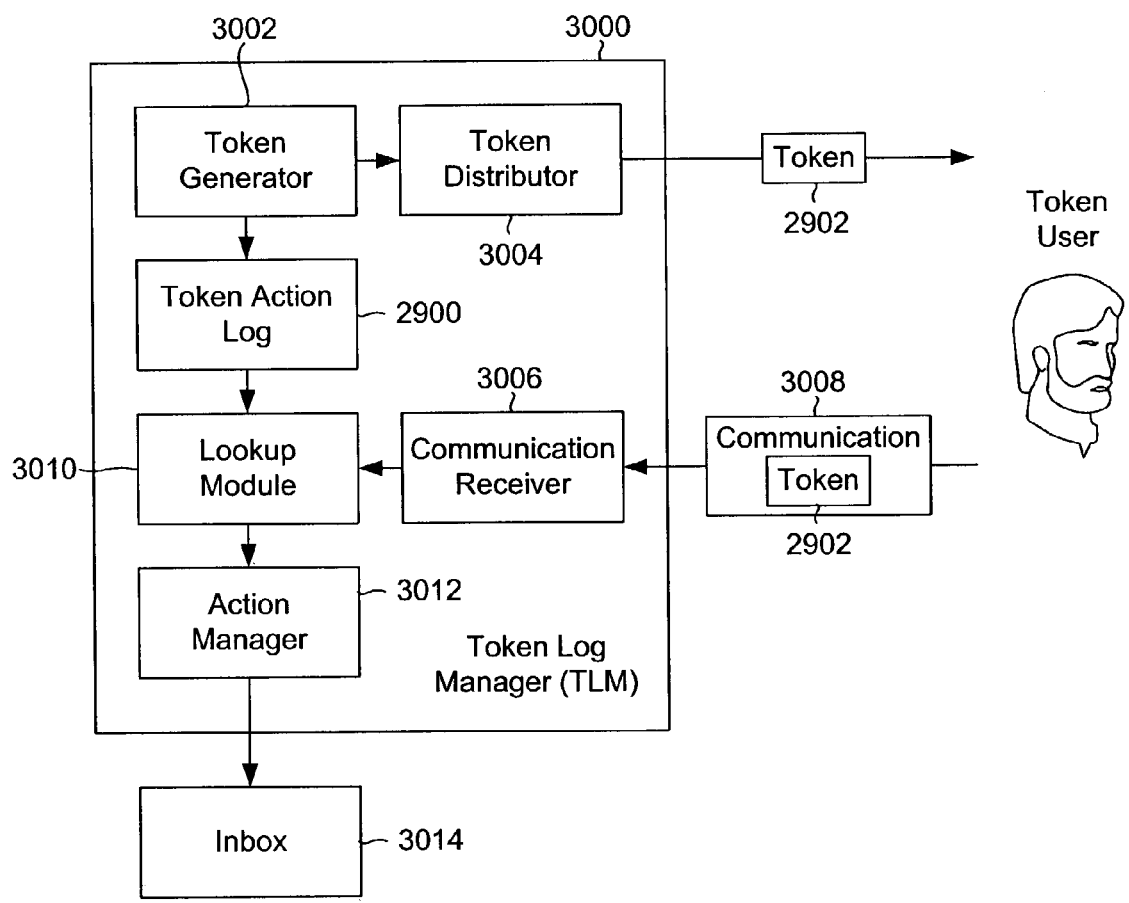
FIG. 30 is a block diagram of a token log manager.

FIG. 30 illustrates modules of a token log manager (TLM) 3000 according to an embodiment of the invention. Each of the modules described herein may be implemented using any suitable combination of software and/or hardware. In certain embodiments, the functionality of two or more modules may be combined into a single module. Alternatively, two or more modules may be used to implement the described functions of a single module.

In the depicted embodiment, the TLM 3000 includes a token generator 3002 to create one or more tokens 2902. As previously noted, tokens 2902 may be arbitrary symbols in any suitable format. The token generator 3202 might generate tokens as random sequences of symbols, or might receive the token symbols from the system operator or some other authorized source.

The TLM 3000 may also include or have access to a token action log 2900 for associating each token 2902 with a customizable set of one or more actions. In addition, the TLM 3000 may include a token distributor 3004 for distributing created tokens 2902 to entities potentially desiring to communicate with a user of the TLM 3000.

In one embodiment, the TLM 3000 includes a communication receiver 3006 to receive a communication 3008 accompanied by a specific token 2902 previously generated by the token generator 3002. The communication receiver 3006 may be coupled to a lookup module 3010 for searching the token action log for a set of one or more actions associated with the specific token 2902 received with the communication 3008.

As illustrated, an action manager 3012 within the TLM 300 may execute the set of one or more actions identified by the lookup module 3010. In one embodiment, the action may be receiving the communication 3008 into an inbox 3014 or the like.

Figure 31:
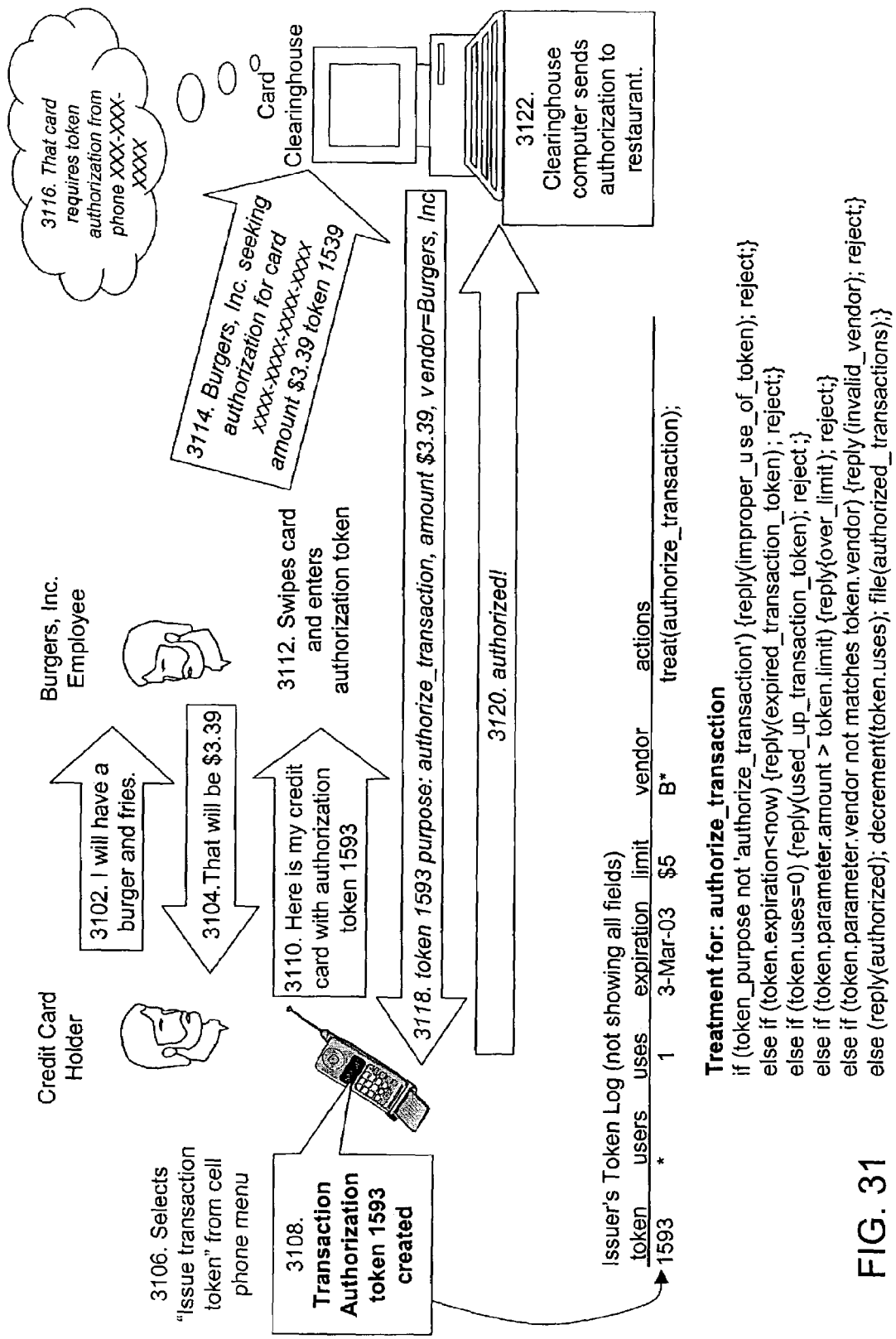
FIG. 31 is a dataflow diagram showing the use of a token action log in the context of financial transaction authorization.

FIG. 31 shows one embodiment of a TLM system to manage financial transactions and prevent fraud. In this example, the TLM is embedded in a mobile phone that is operated by a financial card holder (credit card or debit card). The card holder desires to make a purchase at a business that is hypothetically called "Burgers, Inc."

The card holder indicates his request 3102 and is told the price 3204. The card holder then initiates the TLM on his communication device (i.e. cell phone) by selecting a function to issue a transaction-authorization token 3106. The TLM responds by creating a new token for the purpose of transaction authorization, and allowing the TLM operator to specify conditions for use of that token (e.g. transaction value limit, valid vendor name pattern, etc.) 3108. The TLM may require the operator to enter an authorization code in order to prevent unauthorized operators from issuing transaction authorization tokens on that message device. The card holder reads the token off of the message device screen 3108, and presents it with the card for the transaction 3110. The restaurant employee processes the card as usual, except for also entering the transaction token as required (or having the customer enter the transaction token).

The authorization system sends information about the transaction to the card clearinghouse 3114. The transaction authorization system at the card clearinghouse recognizes that this particular card number requires token transaction authorization from the card holder's message device 3116. This includes knowing the address of the message device, which for a mobile phone would be the phone number.

The clearinghouse system automatically contacts the card holder's message device 3118 with the transaction information including the token. As usual, the TLM looks up the token in the token action log and performs the appropriate actions, which for a valid set of token parameters would be to authorize the transaction 3120. The TLM may log that the transaction was authorized, but otherwise may not need to bother the card holder. The clearinghouse 3122 would then provide the usual authorization information to the company seeking transaction authorization. In certain embodiments, the TLM may actually be stored within the clearinghouse.

In the case of invalid token transaction parameters 3118, the TLM would instead respond by sending an "not authorized" message. For example, if someone steals the card and attempts to authorize another transaction, the TLM will reject the authorization request. This rejection will occur even if a transaction-authorization token is also stolen and included with the transaction authorization request, if the conditions for use of that token are not met.

If the card holder's message device is unavailable to handle an authorization request 1593, then the card clearinghouse may optionally provide a temporary authorization of the transaction to the business. Nevertheless, the effectiveness of this system is much greater if the card holder's message device is available to handle incoming messages with tokens attached. Therefore, the card clearinghouse may only provide temporary authorization of financial transactions under a certain amount.

Figure 32:
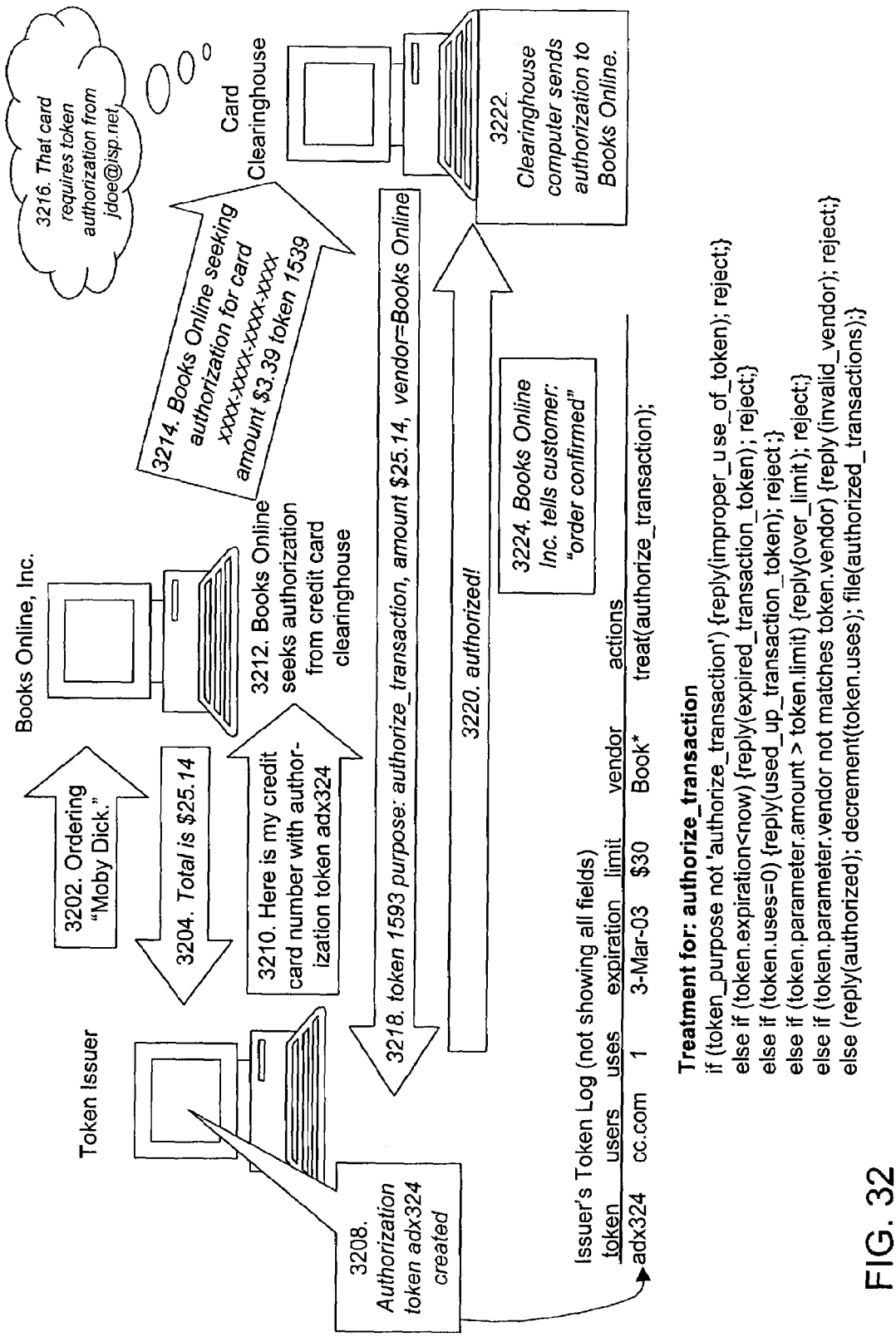
FIG. 32 is a dataflow diagram showing the use of a token action log in the context of an online financial transaction.

FIG. 32 show a similar embodiment as FIG. 31, except for describing an online transaction. The FIG. 32 procedure is very similar to that of the prior figure. The real risk in online transactions is that the customer does not have to present the physical card in order to initiate the purchase. There are frequently stories in the news about people breaking in to merchant computer systems and compromising the safety of credit card numbers. With the embodiment of FIG. 32, stolen credit card numbers would be of little concern.

The legitimate customer places an online order 3202, such as by completing an online "shopping cart." The online merchant system indicates the purchase total 3204 and requests payment. The legitimate customer initiates an "Issue transaction token" function of the TLM on her message device 3206. The TLM creates a token with appropriate conditions for use and actions 3208, and either presents it to the customer for distribution or simply distributes it directly to the merchant 3210.

The merchant seeks credit card number authorization 3212 by sending the transaction information to the card clearinghouse 3214. The card clearinghouse recognizes that the transaction must have token authorization from the given message device 3216, and sends the token and transaction parameters to the token device 3218. The TLM processes the token message in the usual manner, authorizing the transaction 3220 if appropriate. The clearinghouse can authorize the transaction to the online merchant 3222, who could then forward confirmation information to the customer 3224.

The embodiments of FIG. 31 and FIG. 32 could also involve various authentication and encryption methods as are commonly employed in communication systems. Such, for example, could prevent a criminal from "spoofing" (acting as) the appropriate message device and giving false transaction authorization. With appropriate authentication and encryption in place, the only way to authorize a transaction involving a stolen credit card number would be to also steal token authorization information before it becomes invalid, or to "hack" the TLM (which could be kept secure).

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method comprising:
   generating one or more tokens within a communication system of a token originator;
   associating each token with a customizable set of one or more actions in a token action log within the token originator's communication system;
   making the one or more tokens available for distribution to one or more token users, the token users potentially desiring to communicate with the token originator by including the one or more tokens with a communication to be sent to the token originator;
   receiving a communication at the token originator's communication system accompanied by a specific token previously generated within the communication system;
   searching the token action log for a set of one or more actions associated with the specific token; and
   executing the set of one or more actions by the token originator's communication system.

2. The method of claim 1, wherein the communication system is selected from the group consisting of an email system, a telephone system, an instant messaging system, and short text messaging system.

3. The method of claim 1, wherein the communication is accompanied by a second specific token previously generated within the token originator's communication system, the method further comprising:
   searching the token action log for a second set of one or more actions associated with the second specific token; and
   executing the second set of one or more actions by the token originator's communication system.

4. The method of claim 1, wherein each token corresponds to a group of token users.

5. The method of claim 4, wherein at least one group of token users is selected from the set consisting of family members, friends, business associates, and students within a particular class.

6. The method of claim 4, wherein making the one or more tokens available comprises distributing the tokens to the corresponding groups of token users.

7. The method of claim 1, wherein making the one or more tokens available comprises publishing at least a subset of the tokens in a document viewable by token users potentially desiring to communicate with the communication system.

8. The method of claim 7, wherein the document is selected from the group consisting of an online directory, a printed directory, a business card, and a course syllabus.

9. The method of claim 1, wherein making the one or more tokens available comprises transmitting at least a subset of the tokens in a communication to one or more token users potentially desiring to communicate with the communication system.

10. The method of claim 1, further comprising:
    prior to generating one or more tokens within a communication system:
       receiving a communication that does not include a token; and
       requesting an acknowledgement from a sender of the communication; and
    wherein making the one or more tokens available for distribution comprises:
       transmitting a token to the sender in response to receiving the requested acknowledgement.

11. The method of claim 10, wherein requesting an acknowledgment comprises:
    requesting an acknowledgement from the sender that includes a statement of the sender's purpose for the communication.

12. The method of claim 11, wherein transmitting comprises:
    receiving the acknowledgement including the statement of the senders purpose;
    presenting the statement to an operator of the communication system; and
    transmitting a token to the sender in response to receiving an approval from an operator of the communication system.

13. The method of claim 10, wherein requesting an acknowledgment comprises:
    presenting a communication to the sender including an image that depicts a code, wherein the communication instructs the sander to provide an acknowledgement including the depicted code.

14. The method of claim 13, wherein transmitting comprises:
    transmitting a token to the sender in response to receiving an acknowledgement including the depicted code.

15. The method of claim 1, further comprising:
    prior to receiving a communication including a specific token:
       receiving a communication without a token; and
       associating the communication with a toke in response to one or more conditions being satisfied.

16. The method of claim 15, wherein at least one condition includes a return address for the communication being found in an address book of a user of the communication system.

17. The method of claim 1, further comprising attaching one or more tokens to one or more communications already in the communication system.

18. The method of claim 1, wherein at least one action comprises presenting the communication to an operator of the communication system.

19. The method of claim 1, wherein at least one of action is selected from the group consisting of rejecting the communication, sending a reply to the communications filing the communication, logging the communication, tagging the communication with an identifier, deleting the communication, forwarding the communication to a recipient, activating a device, audibly alerting the operator of the communication system, visually alerting the operator of the communication system, extracting information from the communication, modifying the token action log, generating a new token, and sending a previously generated token.

20. The method of claim 1, wherein at least one action includes conditional logic.

21. The method of claim 1, wherein the specific token is accompanied by a set of parameters, and wherein executing the set of one or more actions comprises calling a function with the set of parameters.

22. The method of claim 1, wherein the specific token is associated with conditions for use, and wherein receiving comprises performing one or more operations in response to the conditions of use being satisfied.

23. The method of claim 22, wherein at least one operation comprises rejecting the communication.

24. The method of claim 22, wherein the conditions for use comprise an expiration date.

25. The method of claim 22, wherein the conditions for use comprise a set number of uses of the specific token.

26. The method of claim 1, wherein at least one token is associated with an indication of an issuer of the at least one token.

27. The method of claim 1, wherein at least one token is associated with an indication of one or more token users to whom the at least one token is issued, which indication is recorded within the token originator's communication system.

28. The method of claim 1, wherein at least one token is associated with an indication of en intended purpose for the at least one token.

29. The method of claim 1, wherein making one or more tokens available comprises distributing multiple tokens with different purposes to two or more token users.

30. The method of claim 1, wherein making one or more tokens available comprises distributing multiple tokens with different purposes to one token user.

31. The method of claim 1, further comprising:
tying two or more actions in the token action log to different specific events.

32. The method of claim 1, wherein at least one action in the token action log includes a reference to one or more standard action sets that are referenced by one or more token action Log entries.

33. The method of claim 1, wherein at least one action comprises accepting the communication.

34. The method of claim 1, wherein accepting the communication comprises receiving the communication into an inbox.

35. A system comprising:
a token generation module within a communication system of a token originator to create one or more tokens;
a token action log within the token originator's communication system to associate each token with a customizable set of one or more actions dynamically specifiable by the token originator, wherein each token is to trigger the associated set of one or more actions in response to accompanying a communication that experiences an event;
a token distribution module to make the one or more tokens available for distribution to token users, the token users potentially desiring to communicate with the token originator by including the one or more tokens with a communication;
a communication reception module to receive a communication accompanied by a specific token previously generated within the token originator's communication system;
a lookup module to search the token action log for a set of one or more actions associated with the specific token; and
an action management module to execute the set of one or more actions by the token originator's communication system.

36. The system of claim 35, wherein the event comprises receiving the communication within the communication system.

37. The system of claim 35, wherein the event comprises deleting the communication.

38. The system of claim 35, wherein the communication system is selected from the group consisting of an email system, a telephone system, an instant messaging system, and a paging system.

39. The system of claim 35, wherein the communication is accompanied by a second specific token previously generated within the communication system, and wherein the lookup module is to search the token action log for a second set of one or more actions associated with the second specific token; and
wherein the action management module is to execute the second set of one or more actions.

40. The system of claim 35, wherein each token corresponds to a group of token users.

41. The system of claim 40, wherein at least one group of token users is selected from the set consisting of family members, friends, business associates, and students within a particular class.

42. The system of claim 40, wherein the tokens are distributed to the corresponding groups of token users.

43. The system of claim 35, wherein at least a subset of the tokens is published in a document viewable by token users potentially desiring to communicate with the communication system.

44. The system of claim 43, wherein the document is selected from the group consisting of an online director, a printed directory, a business card, and a course syllabus.

45. The system of claim 35, wherein the token distribution module is to transmit at least a subset of the tokens in a communication to one or more token users potentially desiring to communicate with the communication system.

46. The system of claim 35, wherein the token distribution module is to receive communication that does not include a token, request an acknowledgement from a sender of the communication, and transmit a token to the sender in response to receiving the requested acknowledgement.

47. The system of claim 46, wherein the token distribution module is to request an acknowledgement from the sender that includes a statement of the senders purpose for the communication.

48. The system of claim 47, wherein the token distribution module is to receive the acknowledgement including the statement of the senders purpose, present the statement to an operator of the communication system, and transmit a token to the sender in response to receiving an approval from an operator of the communication system.

49. The system of claim 46, wherein the token distribution module is to present a communication to the sender including an image that depicts a code, wherein the communication instructs the sender to provide an acknowledgement including the depicted code.

50. The system of claim 49, wherein the token distribution module is to transmit a token to the sender in response to receiving an acknowledgement including the depicted code.

51. The system of claim 35, wherein the token distribution module, prior to receiving a communication including a specific token, is to receive a communication without a token and associate the communication with a token in response to one or more conditions being satisfied.

52. The system of claim 51, wherein at least one condition includes a return address for the communication being found in an address book of a user of the communication system.

53. The system of claim 35, wherein an action executed by the action management module is to attach one or more tokens to one or more messages already in the communication system.

54. The system of claim 53, wherein an action executed by the action management module is to present the communication to an operator of the communication system.

55. The system of claim 35, wherein at least one action is selected from the group consisting of rejecting the communication, sending a reply to the communication, tagging the communication with an identifier, deleting the communication, filing the communication, logging the communication, forwarding the communication to a recipient, activating a device, audibly alerting an operator of the communication system, visually alerting an operator of the communication system, extracting information from the communication, modifying the token action log, generating a new token, and sending a previously generated token.

56. The system of claim 35, wherein at least one action includes conditional logic.

57. The system of claim 35, wherein the specific token is accompanied by a set of parameters, and wherein the action management module is to execute the set of one or more actions by calling a function with the set of parameters.

58. The system of claim 35, wherein the specific token is associated with conditions for use, and wherein the communication reception module is to perform one or more operations in response to the conditions for use being satisfied.

59. The system of claim 58, wherein at least one operation comprises rejecting the communication.

60. The system of claim 58, wherein the conditions for use include an expiration date.

61. The system of claim 58, wherein the conditions for use include a set number of uses of the specific token.

62. The system of claim 35, wherein at least one token is associated with an indication of an issuer of the at least one token.

63. The system of claim 35, wherein at least one token is associated with an indication of one or more token users to whom the at least one token is issued, and wherein the system comprises a log for recording the indication.

64. The system of claim 35, wherein at least one token is associated with an indication of an intended purpose for the at least one token.

65. The system of claim 35, wherein the token distribution module is to distribute multiple tokens with different purposes to two or more token users.

66. The system of claim 35, wherein the token distribution module is to distribute multiple tokens with different purposes to one token user.

67. The system of claim 35, wherein the token action log is to tie two or more actions in the token action log to different specific events.

68. The system of claim 35, wherein at least one action in the token action log includes a reference to one or more standard action sets that are referenced by one or more token action log entries.

69. The system of claim 35, wherein the event comprises reading the communication.

70. The system of claim 35, wherein the event comprises printing the communication.

71. The system of claim 35, wherein the event comprises forwarding the communication.

72. The system of claim 35, wherein the event comprises replying to the communication.

73. The system of claim 35, wherein the token action log is dynamically extensible to include a new token.

74. A communication apparatus comprising:

means for generating one or more tokens within a communication system of a token originator;

means for associating each token within the token originator's communication system with a customizable set of one or more actions in a token action log, the token action log being dynamically extensible to include new tokens and associated actions specified by the token originator;

means for making the one or more tokens available for distribution to token users, the token users potentially desiring to communicate with the token originator by including the one or more tokens with a communication that is sent to the token originator;

means for receiving the communication at the token originator's communication system, the communication accompanied by the one or more tokens previously generated within the communication system;

means for searching the token action log for a set of one or more actions associated with the accompanying one or more tokens; and means for executing the set of one or more actions by the token originator's communication system.

75. A computer program product comprising a computer readable medium, the computer readable medium including program code for causing a computing device to performing a method comprising:

generating one or more tokens within a communication system of a token originator;

associating each token with a customizable set of one or more actions in a token action log within the token originator's system;

making the one or more tokens available for distribution to at least one token user potentially desiring to communicate with the token originator by including the one or more tokens with a communication that is sent to the token originator;

receiving the communication at the token originator's communications system, the communication being accompanied by the one or more tokens previously generated within the communication system;

searching the token action log for a set of one or more actions associated with the accompanying one or more tokens; and executing the set of one or more actions by the token originator's communication system.

* * * * *

UNITED STATES PATENT AND TRADEMARK OFFICE
CERTIFICATE OF CORRECTION

PATENT NO.        : 7,010,565 B2
APPLICATION NO.   : 10/382042
DATED             : March 7, 2006
INVENTOR(S)       : Scott E. Sampson It is certified that error appears in the above-identified patent and that said Letters Patent is hereby corrected as shown below:

Column 6, line 45, ". . . be an series of alphanumeric . . ." change to --be a series of alphanumeric--

Column 6, line 47, ". . . may be be a series . . ." change to --may be a series--

Column 10, line 66, ". . . which an event involving . . ." change to --which is an event involving--

Column 11, line 56, ". . . to be called 902." change to --to be called 902.--

Column 11, line 64, ". . . there are more than one token . . ." change to --there is more than one token--

Column 12, line 20, ". . . in the order the appear in . . ." change to --in the order they appear in--

Column 12, line 29, ". . . by having a identified token . . ." change to --by having an identified token--

Column 12, lines 47-48, ". . . is to look use "standard . . ." change to --is to look "standard--

Column 13, lines 29-30, ". . . sends. The this person has . . ." change to --sends. This person has--

Column 13, line 62, ". . . being process the (blank) . . ." change to --being processed the (blank)--

Column 15, line 7, ". . . TLM to handle not handle multiple . . ." change to --TLM to handle multiple--

Column 15, line 62, ". . . This procedures may be . . ." change to --This procedure may be--

Column 16, lines 61-62, ". . . might be a "un-cancel function" . . ." change to --might be an "un-cancel function"--

Column 18, line 5, ". . . request a token, which are . . ." change to --request tokens, which are--

UNITED STATES PATENT AND TRADEMARK OFFICE
CERTIFICATE OF CORRECTION

PATENT NO. : 7,010,565 B2
APPLICATION NO. : 10/382042
DATED : March 7, 2006
INVENTOR(S) : Scott E. Sampson It is certified that error appears in the above-identified patent and that said Letters Patent is hereby corrected as shown below:

Column 18, line 61, "... even Without communicating ..." change to --even without communicating--

Column 19, line 59, "... was describe earlier ..." change to --was described earlier--

Column 20, line 43, "...discern the, code and ..." change to --discern the code and--.

Column 23, line 46, "...and short text messaging ..." change to --and a short text messaging--

Column 24, line 31, "... the senders purpose; ..." change to --the sender's purpose--

Column 24, line 51, "... with a toke in response ..." change to --with a token in response--

Column 24, line 65, "...to the communications filing ..." change to --to the communications, filing--

Column 25, line 32, "... indication of en intended purpose ..." change to --indication of an intended purpose--

Column 25, line 46, "... action Log entries." change to --action log entries.--

Column 26, line 55, "... statement of the senders purpose ..." change to --statement of the sender's purpose--

Column 26, line 59, "... statement of the senders purpose, ..." change to --statement of the sender's purpose--

UNITED STATES PATENT AND TRADEMARK OFFICE
CERTIFICATE OF CORRECTION

PATENT NO. : 7,010,565 B2
APPLICATION NO. : 10/382042
DATED : March 7, 2006
INVENTOR(S) : Scott E. Sampson It is certified that error appears in the above-identified patent and that said Letters Patent is hereby corrected as shown below:

Column 28, lines 43-44, ". . . device to performing a method . . ." change to --device to perform a method--

Signed and Sealed this

Thirtieth Day of January, 2007

JON W. DUDAS
*Director of the United States Patent and Trademark Office*